(12) United States Patent
Stemmle et al.

(10) Patent No.: US 8,022,329 B2
(45) Date of Patent: Sep. 20, 2011

(54) SYSTEM AND METHOD FOR FULL ESCORT MIXED MAIL SORTER USING MAIL CLAMPS

(75) Inventors: Denis J. Stemmle, Stratford, CT (US); Douglas B. Quine, Bethel, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 746 days.

(21) Appl. No.: 11/885,231

(22) PCT Filed: Dec. 7, 2005

(86) PCT No.: PCT/US2005/044560
§ 371 (c)(1),
(2), (4) Date: Jun. 12, 2008

(87) PCT Pub. No.: WO2006/063204
PCT Pub. Date: Jun. 15, 2006

(65) Prior Publication Data
US 2008/0230449 A1    Sep. 25, 2008

Related U.S. Application Data

(60) Provisional application No. 60/634,014, filed on Dec. 7, 2004.

(51) Int. Cl.
*B07C 5/00* (2006.01)
(52) U.S. Cl. .................. 209/584; 209/900
(58) Field of Classification Search .......... 209/583, 209/584, 900, 903, 909, 912; 700/217, 228, 700/229; 198/803.7, 803.8; 414/751.1, 753.1; 294/106
See application file for complete search history.

(56) References Cited

U.S. PATENT DOCUMENTS 803,968 A    11/1905    Barry
(Continued)

FOREIGN PATENT DOCUMENTS

EP    0000304    1/1979
(Continued)

OTHER PUBLICATIONS

"Development of in-process skew and shift adjusting mechanism for paper handling," American Society of Mechanical Engineers http://www.directtextbook.com, 1998.

(Continued)

*Primary Examiner* — Joseph C Rodriguez
(74) *Attorney, Agent, or Firm* — Leland Schultz, Esq.; Roberts Mlotkowski Safran & Cole, P.C.

(57) ABSTRACT

A sorting system accepts a group of mail pieces at a loading station, sorts them, and then moves them to an unloading station. The system includes a reader for retrieving delivery information associated with each mail piece, and also includes clamps dimensioned for receipt of a mail piece into each clamp. The system has a device for creating an association between the retrieved delivery information of each mail piece and its respective clamp. The system also has a sorter for moving the clamps holding the mail pieces, based upon the association of each clamp with the retrieved delivery information, so that the mail pieces held by the clamps are sorted according to a desired delivery sequence. Additionally, the system includes a mechanism for opening the sorted clamps to release the mail pieces at the unloading station.

27 Claims, 22 Drawing Sheets

U.S. PATENT DOCUMENTS

| | | | |
|---|---|---|---|
| 1,423,952 A | | 7/1922 | McCracken |
| 2,446,610 A | | 8/1948 | Renfro |
| 2,852,257 A | | 9/1958 | Sperry |
| 3,032,341 A | * | 5/1962 | Reist ............... 271/199 |
| 3,055,480 A | | 9/1962 | Hyman |
| 3,420,368 A | | 1/1969 | Sorrells |
| 3,452,509 A | | 7/1969 | Hauer |
| 3,587,856 A | | 6/1971 | Lemelson |
| 3,659,890 A | | 5/1972 | Renfro |
| 3,757,939 A | | 9/1973 | Henig |
| 3,884,370 A | | 5/1975 | Bradshaw et al. |
| 3,889,811 A | | 6/1975 | Yoshimura |
| 3,901,797 A | | 8/1975 | Storace |
| 3,904,027 A | | 9/1975 | Gilles et al. |
| 3,904,516 A | | 9/1975 | Chiba |
| 3,933,094 A | | 1/1976 | Murphy |
| 3,960,264 A | | 6/1976 | Carbine et al. |
| 4,008,813 A | | 2/1977 | Leersnijder |
| 4,058,217 A | | 11/1977 | Vaughan |
| 4,106,636 A | | 8/1978 | Ouimet |
| 4,169,529 A | | 10/1979 | Hunter |
| 4,244,672 A | | 1/1981 | Lund |
| 4,303,503 A | | 12/1981 | de Mimerand et al. |
| 4,507,739 A | | 3/1985 | Haruki |
| 4,627,540 A | | 12/1986 | Takeda |
| 4,632,252 A | | 12/1986 | Haruki et al. |
| 4,641,753 A | | 2/1987 | Tamada |
| 4,681,213 A | | 7/1987 | Winiasz |
| 4,688,678 A | | 8/1987 | Zue |
| 4,738,368 A | | 4/1988 | Shaw |
| 4,848,538 A | | 7/1989 | Vaida et al. |
| 4,868,570 A | | 9/1989 | Davis |
| 4,874,281 A | | 10/1989 | Bergerioux |
| 4,878,577 A | | 11/1989 | Romero Lledo et al. |
| 4,891,088 A | | 1/1990 | Svyatsky |
| 4,895,242 A | | 1/1990 | Michel |
| 4,921,107 A | | 5/1990 | Hofer |
| 4,921,294 A | * | 5/1990 | Klopfenstein ............... 294/99.1 |
| 4,923,022 A | | 5/1990 | Hsieh |
| 4,965,829 A | | 10/1990 | Lemelson |
| 4,978,117 A | | 12/1990 | Maier et al. |
| 5,031,223 A | | 7/1991 | Rosenbaum |
| 5,042,667 A | | 8/1991 | Keough |
| 5,072,401 A | | 12/1991 | Sansone et al. |
| 5,119,954 A | | 6/1992 | Svyatsky |
| 5,186,336 A | | 2/1993 | Pippin |
| 5,291,002 A | | 3/1994 | Agnew |
| 5,470,427 A | | 11/1995 | Mikel |
| 5,480,032 A | | 1/1996 | Pippin |
| 5,718,321 A | | 2/1998 | Brugger |
| 5,838,277 A | | 11/1998 | Loomis et al. |
| 5,880,958 A | | 3/1999 | Helms et al. |
| 5,881,890 A | | 3/1999 | Wiley |
| 5,981,891 A | | 11/1999 | Yamashita |
| 6,029,111 A | | 2/2000 | Croyle |
| 6,126,017 A | | 10/2000 | Hours |
| 6,208,910 B1 | | 3/2001 | Michael et al. |
| 6,227,378 B1 | | 5/2001 | Jones |
| 6,276,509 B1 | | 8/2001 | Schuster |
| 6,347,710 B1 | | 2/2002 | Ryan |
| 6,365,862 B1 | | 4/2002 | Miller |
| 6,394,449 B1 | | 5/2002 | Reist |
| 6,403,906 B1 | | 6/2002 | De Leo |
| 6,411,897 B1 | | 6/2002 | Gaspard, II |
| 6,435,353 B2 | | 8/2002 | Ryan |
| 6,443,311 B2 | | 9/2002 | Hendrickson |
| 6,464,067 B1 | | 10/2002 | Reist |
| 6,555,776 B2 | | 4/2003 | Roth et al. |
| 6,561,339 B1 | | 5/2003 | Olson |
| 6,561,360 B1 | | 5/2003 | Kalm |
| 6,677,548 B2 | | 1/2004 | Robu |
| 6,814,210 B1 | | 11/2004 | Hendzel |
| 6,856,860 B2 | | 2/2005 | Stringham et al. |
| 6,897,395 B2 | | 5/2005 | Shiibashi |
| 6,921,875 B2 | * | 7/2005 | Hanson ............... 209/583 |
| 6,946,612 B2 | | 9/2005 | Morikawa |
| 6,953,906 B2 | | 10/2005 | Burns |
| 6,994,220 B2 | | 2/2006 | Schererz |
| 7,004,396 B1 | | 2/2006 | Quine |
| 7,111,742 B1 | | 9/2006 | Zimmermann |
| 7,112,031 B2 | | 9/2006 | Harres |
| 7,138,596 B2 | | 11/2006 | Pippin |
| 7,170,024 B2 | | 1/2007 | Burns |
| 7,210,893 B1 | | 5/2007 | Overman |
| 7,227,094 B2 | | 6/2007 | Oexle |
| 7,235,756 B2 | | 6/2007 | De Leo |
| 7,259,345 B2 | | 8/2007 | Kechel |
| 7,259,346 B2 | | 8/2007 | Svyatsky |
| 7,304,260 B2 | | 12/2007 | Boller |
| 7,378,610 B2 | | 5/2008 | Umezawa |
| 7,396,011 B2 | | 7/2008 | Svyatsky |
| 7,397,010 B2 | | 7/2008 | Wilke |
| 7,397,011 B2 | | 7/2008 | Berdelle-Hilge |
| 7,464,822 B2 | | 12/2008 | Coffelt et al. |
| 2002/0053533 A1 | | 5/2002 | Brehm |
| 2002/0139726 A1 | | 10/2002 | Roth et al. |
| 2003/0006174 A1 | | 1/2003 | Harres |
| 2003/0038065 A1 | | 2/2003 | Pippin et al. |
| 2004/0030661 A1 | | 2/2004 | Amato |
| 2005/0131576 A1 | | 6/2005 | De Leo et al. |
| 2006/0070929 A1 | | 4/2006 | Fry |
| 2006/0124512 A1 | | 6/2006 | Quine |
| 2006/0180520 A1 | | 8/2006 | Ehrat |
| 2006/0191822 A1 | | 8/2006 | Avant |
| 2007/0090029 A1 | | 4/2007 | Avant |
| 2007/0131593 A1 | | 6/2007 | Burns |
| 2007/0272601 A1 | | 11/2007 | Cormack |
| 2008/0011653 A1 | | 1/2008 | Stemmle |
| 2008/0012211 A1 | | 1/2008 | Stemmle |
| 2008/0027986 A1 | | 1/2008 | Stemmle |
| 2008/0093273 A1 | | 4/2008 | Stemmle |
| 2008/0093274 A1 | | 4/2008 | Stemmle |
| 2008/0164185 A1 | | 7/2008 | Stemmle |

FOREIGN PATENT DOCUMENTS

| | | |
|---|---|---|
| EP | 1528496 | 5/2005 |
| GB | 2 382 559 | 4/2003 |
| JP | 1-159088 A | 6/1989 |
| JP | 1-271789 A | 10/1989 |
| WO | WO03/011484 | 2/2003 |

OTHER PUBLICATIONS

Industrial Embedded HPC Applications-Supercomputer; G. Deconinck; p. 26-27, 1997.
"The Role of Intelligent Transportation System (ITS) in Intermodal Air Cargo Operations," Nexter, Dec. 2000.
"On the Road to Service," ORMS, Aug. 2000.
Office Action dated Oct. 12, 2010 in U.S. Appl. No. 11/885,230.
Notice of Allowance dated Dec. 29, 2010 in U.S. Appl. No. 11/885,242.
Final Office Action dated Aug. 24, 2010 in U.S. Appl. No. 11/885,242.
Office Action dated Mar. 10, 2010 in U.S. Appl. No. 11/885,242.
European Search Report dated May 4, 2011 for corresponding EP Appl. No. 05853468.6-2307.
Final Office Action dated Mar. 16, 2011 for corresponding U.S. Appl. No. 11/885,230.

* cited by examiner

SYSTEM AND METHOD FOR FULL ESCORT MIXED MAIL SORTER USING MAIL CLAMPS

CROSS-REFERENCE TO RELATED APPLICATION

The present application claims priority to U.S. Provisional Application No. 60/634,014 filed Dec. 7, 2004 which is also incorporated by reference herein.

TECHNICAL FIELD

The present invention relates generally to mail sorting, and more particularly to one-pass carrier sequence sorting, and multi-pass sorting systems.

BACKGROUND OF THE INVENTION

Many posts around the world are seeking to develop a more effective mail merging system that automatically merges all mail streams and sorts them to delivery sequence. The system should accomplish this merging at the step of carrier sequence sorting by merging all elements of the mail stream (letters, flats, periodicals, post cards etc) at the final sorting process.

At present, some of the mail streams arrive at the postal branch offices pre-sorted, and some do not. Generally, even when the mail arrives at the branch already sorted by delivery sequence, postal carriers need to merge multiple streams of mail (often as many as 10) from different mail trays—and for this the postal carriers generally use a manual sorting process. When mail does not arrive at the branch pre-sorted, the carriers spend-even more time—several hours—sorting the mail into carrier delivery sequence manually. Often, the carrier on mechanized routes will complete the mail merging while sitting at each post box—merging mail from multiple mail trays on the spot before placing it in the mailbox. This requires carriers to spend substantial time merging and sorting the mail before they can start to deliver it, or else they must complete the merging while they are delivering the mail, thus making the mail delivery process (the last mile) quite inefficient. The instant invention corrects that inefficiency in an automated manner that accommodates not only normal types of mail, but also mail pieces having exceptional physical characteristics.

In 1990, the United States Postal Service (USPS) issued a Request for Proposal for a carrier sequence bar code sorter, type B, a single pass sorter to arrange mail in carrier delivery sequence. To date, 14 years later, no product has been manufactured and delivered to satisfy that need.

Today, many posts sort a percentage of letters to delivery sequence at central sorting facilities. Letters and flats are currently sorted separately on different pieces of sorting equipment designed to sort only a limited range of mail piece types. The sorting is done centrally because the equipment required to automate this process is simply too large to fit in the branches. The cost would be prohibitive for the USPS to install such equipment in each branch. Furthermore, sorting centrally is also much more efficient, since the only sorters available today are multiple pass sorters which may include over a hundred bins and may require two or more sort sequences to get the mail in delivery sequence order. However, when the carrier delivery sequence sorting is done centrally and separately on each different category of mail (letters, flats, and others), and then sent to branch offices, the carriers must still spend the first two to three hours of their day merging and sorting flats, periodicals, brochures, and all the other mail that could not be sorted to delivery sequence automatically. For many posts, all the mail is still sorted by the carriers manually into delivery sequence.

The sorters available today have significant limitations: they are either huge, expensive pieces of equipment with a very large number of bins, and require significant space to operate; or they have a smaller number of bins, but require multiple passes to operate. This multi-pass operation is a very labor-intensive process. So, for example, a sorter with 16 bins, sorting a batch of mail to 600 addresses, will require three passes. That means the operator must load the mail, operate the sorter, then unload the mail from each bin and re-load it into the feeder three times. While this results in some time savings compared to manual sorting, the value proposition is limited because of the high labor content. See, for example, US Patent Application Publication No. 20020139726 entitled Single Feed One Pass Mixed Mail Sequencer, filed Apr. 2, 2001.

Unfortunately, even the best available mail sorting systems are prone to failure, especially when dealing with mail pieces having exceptional physical characteristics (e.g. due to exceptional bulk, size, or weight). Even with standard, conventional letters, the best available sorters can jam and shut down, thereby reducing efficiency.

Another application for the instant invention is for sorting incoming mail in enterprises. The manual method is still the most common method that enterprises use to sort their incoming mail. This is also very labor intensive, but the investment required and the size of available mail sortation equipment is generally prohibitive.

The postal services around the world have been investing heavily in automated mail sorting systems over the past several years. The systems currently planned or currently being used have several limitations with respect to the invention disclosed herein. Such systems are designed to sort letters only, or flats only, but not both in combination. This results in multiple mail streams that must be manually merged by the carriers, making the carrier inefficient. Another limitation is that such systems use conventional, high speed mail handling technology, in which the mail pieces undergo multiple high accelerations, stops, starts, twists, inversions, deflections, and other manipulations; which results in undesirable jams and damage to the mail. A further limitation is that the existing systems require multiple passes (multiple feedings and multiple unloadings of the sorter bins) in order to sort mail to the delivery sequence for a carrier route. This requires a substantial amount of manual labor to load mail into the feeders and unload the sorters multiple times, and increases the risk of jams and damage because of the multiple passes of each mail piece. This also requires careful sequencing during load, which is a process prone to human error.

The address reading and interpretation systems are far from perfect (and probably will be well into the future). So, the automated sorting is usually augmented by a video encoding scheme in which images of the unreadable addresses are captured, transmitted to a remote video encoding site at which a human interprets the addresses and keys in the interpretation, then sends this "correct information" back to the sorter where it is printed in encoded form on the mail. While this encoding operation is happening, the unreadable mail must be stored either in a buffer in the sorter transport, or in a bin for later manual re-loading into the sorter. This system is complex, expensive, and involves multiple extra steps—but is necessary because of the limitations of the address reading technology.

Because the sorting equipment tends to be very large and very expensive, the posts emphasize operating it at very high speeds, and with very high capacities. Thus, the automated sorting operations are only installed in large centralized sorting facilities. The sorted mail is then shipped to the local destination delivery unit (DDU), where it is loaded on the vehicles used by the carriers. Note that a "delivery destination unit" (DDU) is sometimes called a "delivery office," and therefore a DDU also refers to a "delivery office" throughout this application. However, because the mail is sorted centrally, the carrier must still spend 2.5 to 3 hours each day manually sorting mail that arrived at the DDU and mail that could not be sorted automatically. While on the route, the carrier than merges the mail sorted automatically with the mail sorted manually, which makes the carriers even less efficient.

Because the existing sorting equipment is operated at very high speeds, a large percentage of the current mail streams cannot be handled reliably with the existing equipment. An average of about 20% of mail received at the posts is "non-machinable" with the existing high speed equipment. Often, hundreds of workers are employed to manually identify and cull out this mail for separate handling before the machinable mail is loaded into the high speed sorters. The non-machinable mail requires a significant amount of manual manipulation, storing, transportation, and sorting. It would be very desirable to reduce the amount of non-machinable mail.

Recently, some progress has been made in dealing with the aforementioned problems. For example, U.S. Provisional Patent Application Ser. No. 60/589,634, filed Jul. 21, 2004 is incorporated herein by reference, and is a previous version of the present invention. That previous version used a folder/divider system for escorting mail through a sortation system, and thus had various drawbacks, such as difficulties with the unload step, and the possibility of jams while moving the mail pieces out of the folder/dividers. That previous version disclosed a method for sorting a wide variety of mail piece sizes and weights in a single pass. The paper handling architecture described therein improved upon previous mail sorters in that during the sorting operation, the mail is contained within folder/dividers, and the mechanism to transport the mail operates on the folder/divider, not the mail itself. Nevertheless a folder/divider system is not an optimum method for efficiently sorting mail, and it would be advantageous to use a different technique that extends the capabilities or Application 60/589,634 while reducing the amount of paper handling required.

One of the features of the USPS Intelligent Mail® products and services is the ability to track ordinary mail pieces from ingestion into the post to the final delivery. Frequently, the planet codes are employed to enable this process. Planet codes, however, can only be used to track the mail to the last point where the planet code was scanned, usually in a sorting operation. Other special handling items, such as registered mail, can be scanned by the postal carrier using a hand held scanner at the point of delivery. This operation takes considerable time on the part of the carrier, and is not really suitable to use for tracking all intelligent mail pieces.

In U.S. provisional application Ser. No. 60/589634, filed Jul. 21, 2004, owned by the present assignee, the disclosure addressed the USPS DPP initiative, which proposes to wrap all the mail for each address into a single bundle to facilitate delivery. That disclosure proposed the following solution: An ink jet printer could print a unique bar code on each wrapped packet—and the system software links this code with all of the bar codes, planet codes, Postnet barcodes, and any other scanned and stored information on the surface of the mail piece. When the carrier delivers the entire packet, the carrier scans only the external barcode at each address—and the software links this in the system memory with all the pieces in the packet. So, only one scan is required per delivery point, regardless of the number of coded mail pieces are bundled in the packet. An interesting alternative is possible with the use of RFID tags affixed to the wrapper material either instead of or in addition to the printing subsystem. So, during the wrapping process, the RFID tag could be provided with a unique identifier for each packet, which would be associated and linked with all the information (codes, etc) previously scanned on each or the enclosed mail pieces. This technology will make the carrier even more efficient at the point of each delivery. Instead of a separate action to scan a bar code on the wrapper, the carrier carries an RFID interrogator unit to read the information on each RFID tag as the bundle is being delivered, and provide feedback information to the central database that all the contents of the bundle were delivered at the noted time. Additionally, the RFID interrogator unit could be adapted to include an audio capability so that when the information is extracted from the wrapper by RFID interrogation, and if one or more pieces of mail in the packet requires action on the part of the carrier (example, get the receiver's signature), the carrier can be prompted or alerted audibly by the RFID unit to take the required action.

These concepts for tracking the mail enabled by the information generated during the sorting operations are dependent on the USPS intent to bundle the mail for each delivery point into a single packet. Recently, the USPS has conducted a marketing survey on this concept, and has discovered that the mailers and the mail receivers do not like it. So, there is a real possibility that the USPS will abandon the idea of putting the mail into packets; and therefore, as described in provisional patent application U.S. Patent Application Ser. No. 60/589634, the opportunity to employ the methods previously disclosed to track the mail all the way to the delivery point may be lost.

SUMMARY OF THE INVENTION

According to the present invention, each mail piece is singulated, then captured by a clamp. From that point on, all mechanical operations act on the clamp, and the mail piece is not touched by either the operator or the sorter equipment. Because all the clamps are substantially identical in shape and composition, they can be manipulated by the machinery with a high degree of reliability. This configuration overcomes nearly all the limitations of existing sorters. The present system is capable of handling the entire diversity of the shapes, sizes and weights of mail stream with a consistent reliability. The principle of this invention is: do not handle the mail, but instead handle the clamps.

With respect to the drawbacks described above for existing mail sorter systems, the present system has a large variety of advantages. The present system automatically handles letters, flats, postcards, periodicals, odd shaped mail pieces, and even parcels up to a specified, maximum thickness, simultaneously, and intermixed in any order or combination. This system has orders of magnitude wider material handling latitude without adjustments. This capability significantly enhances efficiency.

Also, the present system touches/handles each mail piece only once to singulate and load it into a clamp. After that, there is no more mail handling—only clamp handling. Thus, even with the full gamut of mail piece types, sizes, weights, conditions, etc, the system will be dramatically more reliable (fewer jams) than conventional sorting systems.

Moreover, the present system is capable of sorting all mail into carrier delivery sequence in a single pass. There is no need for manual unloading and reloading the sorter for multiple pass operations. Thus, the present system not only completes the job more quickly than conventional sorters, but requires far less labor in the process.

Additionally, the present system eliminates the need to handle the non-readable mail separately. All mail is handled in exactly the same way. Every mail piece is fed, read, clamped, and moved into the sorter system whether the address is readable or not. Video encoded data is appended to the mail piece location electronically. There is no need to spray on additional information, which saves the cost of the printing subsystem. And there is no need to store the mail during the video encoding step. So, the present sorter is much more compact and less expensive because these subsystems (printing and temporary storage transports) are not required.

Additionally, the present sorter is modular, so it can be configured to any size, capacity, or shape, to fit existing facilities without modification. A relatively small version of this sorter can fit in each DDU and complete the final sort for each route just before the sorted mail is loaded onto the trucks—so that all the mail that arrives at the DDU can be included in the one and only sort operation. This makes the carriers very efficient by eliminating about 2.5 hours or mail sorting each day, and further eliminates time at each address merging multiple streams of mail manually.

Not only is the present machine more reliable because it handles clamps rather than mail in a single pass, but it is also more reliable because it operates at slow speeds while maintaining very high sorting throughput rates. This maximizes system up-time with jam-free operation, and substantially fewer maintenance operations.

The system can process mail from three or more different routes simultaneously: one in the feeding operation, a second route in the sorting operation, and a third route in the unload and traying operation. This significantly reduces job time per route. Only the steps of singulating the mail and transporting it to the clamping operation are not escorted.

For all transporting, sorting, and unloading operations, the system handles and manipulates the clamp, not the mail. After unloading, clamps are retained in the system and re-circulated. The present system is fully modular, so that any capacity or footprint can be easily configured without customizing the design of the component modules.

Various aspects of the present invention improve upon the sorter disclosed in the provisional patent application U.S. Patent Application Ser. No. 60/589634, filed Jul. 21, 2004. One such improvement is loading each mail piece into a clamp, and handling the clamps rather than the mail pieces. Another improvement is recycling empty clamps back to the feeder. Additionally, the present invention employs a single pass system that sorts to carrier sequence by moving unsorted mail on a first transport, and moving sorted mail to a second transport in a specific sequence, using clamps and clamp driving means to convey the mail. Further improvements included in the present invention are: feeding the clamped mail pieces into a queue before starting the sorting step, and also performing three separate operations (feeding, sorting, and unloading) simultaneously with three separate batches of mail associated with three separate routes. The present system handles non-machine readable mail in exactly the same fashion as machine readable mail. (Also, eliminates the need to print additional information on non-readable mail.) Other innovations of the present invention include a clamp management system in which the clamps are oriented upside down for loading, right side up for sorting, then upside down again for unloading; a clamp management system in which the clamps can be moved from one drive system to at least one additional drive system (for sorting); and a clamp management system in which clamps can be initially spaced at a distance from one another, and then subsequently the distance removed so that the clamps abut one another. Also included in the present invention is a sorting system in which the mail pieces are handled in an orientation in which the faces of the mail pieces are perpendicular to the direction of motion throughout all sorting operations in order to reduce the system footprint and operate at slow speeds without reducing the sorting throughput rate.

According to the sorting system of the present invention, the system accepts a group of mail pieces at a loading station, sorts the group of mail pieces into a desired delivery sequence according to delivery information on the mail pieces, and then moves the mail pieces to at least one unloading station. The system includes a reader for retrieving delivery information associated with each mail piece, and also includes clamps dimensioned for receipt of a mail piece into each clamp. The system has means for placing each mail piece into one of the clamps, and means for creating an association between the retrieved delivery information of each mail piece and its respective clamp. The system also has a sorter for moving the clamps which hold the mail pieces, based upon the association of each clamp with the retrieved delivery information, so that the mail pieces held by the clamps are sorted according to the desired sequence. Additionally, the system includes means for opening the sorted clamps to release the mail pieces at the unloading station.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

BEST MODE FOR CARRYING OUT THE INVENTION

Figure 1A:
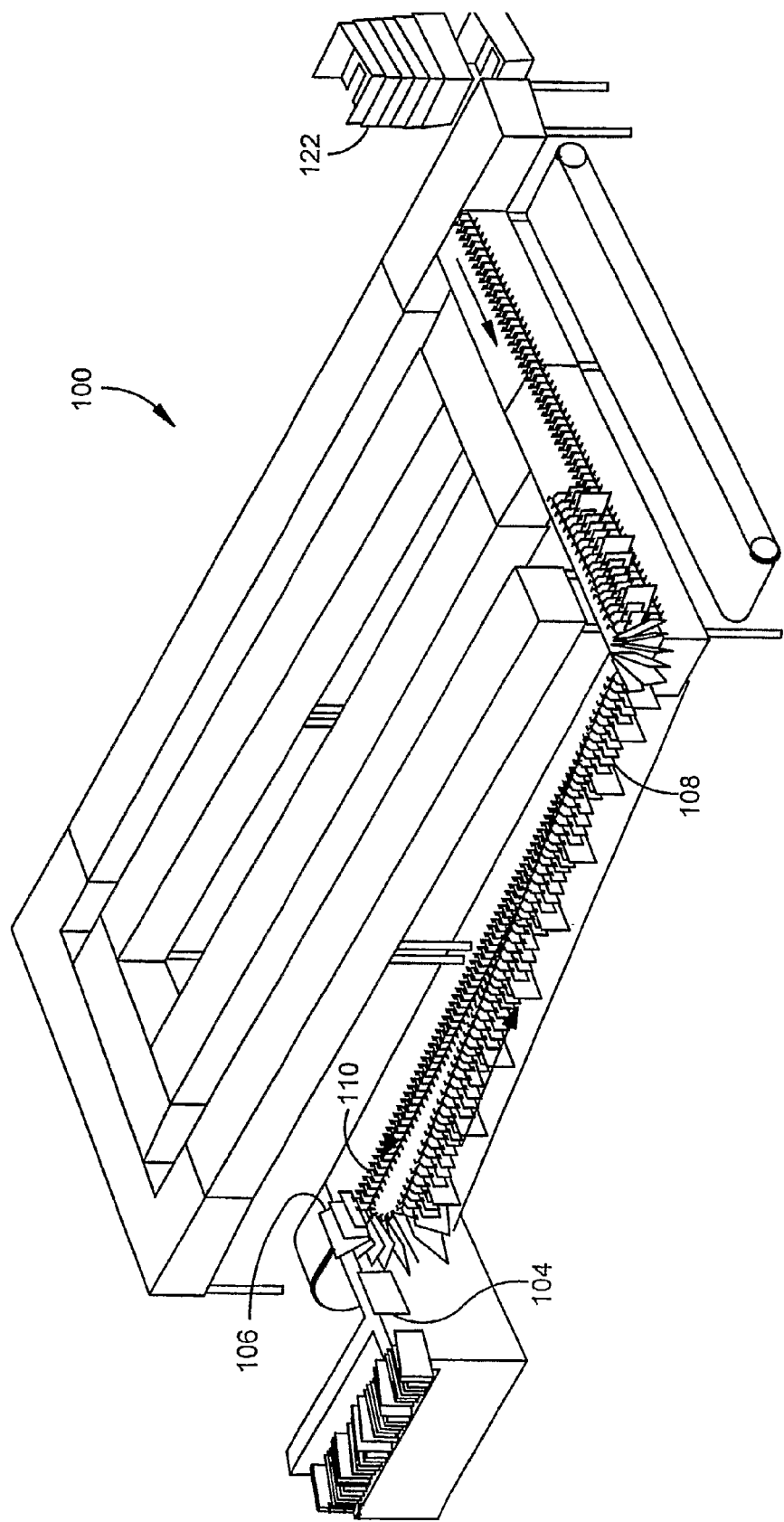
FIGS. 1A-1E are perspective views of a sorter in accordance with the instant invention, showing a series of steps of the sorter operation.

This invention is an automated mail sorter that handles many types of mail (e.g. letters, flats, postcards, periodicals, odd shaped mail pieces, and even parcels up to a specified thickness), in a single sorting operation. It is able to sort to carrier delivery sequence in a single pass and automatically load the sorted mail into mail trays, which can be directly loaded onto the carrier's mail truck. In this embodiment of the invention, the mail is touched only once by the operator and by the sorter. The best mode embodiment described in this section is presented by way of example, and thus does not limit or narrow the claimed invention, but rather explains in detail one way of implementing the invention, among many other ways.

As mentioned, the instant invention provides a significant improvement to the sorter disclosed in U.S. Patent Application Ser. No. 60/589634, by replacing the folder/divider system for escorting mail with a mail clamping system. Each mail piece is singulated and transported past an image capture station, then loaded into a clamp. While the mail piece is being transported to the clamp loading operation, optional additional steps could also be performed such as measuring the dimensions of the mail piece, weighing it, or printing information on it. After loading, all operations required for moving, sorting, and unloading the mail pieces are performed on the clamp, and not the mail. In fact, the instant sorter is expected to be capable of handling the entire range of mail piece types, including post cards, letters, flats, periodicals, magazines, newspapers, and even parcels up to a specified thickness—all randomly intermixed—with world class performance with respect to shutdown and jam rates. This claim is enabled by the disclosed architecture, especially the aspect of manipulating the clamps without touching the mail.

Besides the overall concept for handling mail using clamps, practical details such as how to get the mail pieces into the clamp, how to remove the mail from the clamp, how to propel the clamps, and how to move the clamps through multiple drive mechanisms for the various functions to be accomplished are important details. This following description addresses those various requirements, as well as providing a clamp that is inexpensive to fabricate, and thin enough to keep the overall footprint of the sorter to a minimum.

The term "full escort" system is based on the principle of "the best way to handle mail is to not handle it." "Full escort" means capturing the mail (having wide diversity in sizes, shapes, weights, etc) in an escort device (having uniform and controllable shape), and manipulate the escort device without having to touch the mail. Developing reliable and repeatable mechanisms is achievable when the control systems and all mechanical parts can be specified by the design engineer. Developing a reliable system that directly handles the mail itself is far more difficult because the engineer has no control over the parameters associated with the mail pieces. Typically, in current sorters, the range of mail pieces to be handled has been artificially limited to only a portion of the mail stream (letters only, for example, or flats only), and by manually removing mail pieces that are prone to causing shutdowns in the current sorting equipment, in order to achieve some level of mail handling reliability.

To date, no product exists that can successfully handle the wide diversity of mail piece types at any level of reliability. That is one of the goals which the instant invention can help to achieve.

A mail clamp capable of grasping and holding a range of mail piece sizes—from post cards up to a specified thickness for parcels—in order to escort the mail pieces through a "full escort" sorter system is disclosed herein. The clamp used in the present invention includes features for supporting the clamp and mail piece from a set of rails, and for driving the clamp along paths using lead screws on either side of the clamp by engaging one of two tabs on either side of the clamp. The clamp further includes a method for opening the jaws of the clamp for loading and unloading mail pieces, and an additional tab feature for engaging a drive to move the clamps laterally from one drive system to a second drive system. The clamp drive systems include methods for advancing the clamps in a linear direction, moving the clamps laterally for sorting, moving the clamps through a 180 degree turn in a horizontal plane, a 180 degree turn in a vertical plane for inverting the clamp, a 180 degree turn through a helical path, and a 180 degree turn along a path that lifts the clamp from a first level to a second level. The clamps remain captured by the sorter drives at all times, and are re-circulated through the sorter for re-use from one job to the next.

The clamps used in the present invention enable a full escort sorting system in which all mechanical interactions are between the drives and the clamps, and the mail piece itself is not touched after it is singulated. This will result in unprecedented reliability in mail handling without jams or shutdowns.

The disclosed clamp has—in this embodiment—a width of less than 0.2" in order to compress the mail piece pitch to 0.2", thereby insuring the sorter has a small footprint.

The clamp used in the present invention is capable of grasping and exerting sufficient force to hold mail pieces as small as a single thickness of paper, and also thick mail piece or parcels up to a specified maximum thickness. This enables intermixing almost the entire mail stream in random order within the sorter.

The clamp and associated drive system further includes the capability to escort the sorted mail pieces directly into a mail tray so that even the sorter unloading is fully automated, thereby saving substantial labor normally associated with postal sorting unloading operations. Such automated unloading is described below.

The clamp and associated drive systems are capable of manipulating the clamp through many different paths of the sorter to achieve sorting in a single pass. The paths include linear segments, curved segments in horizontal and vertical directions, lateral segments in which the drive control is passed from one clamp transport to another, and a helical path in which the clamp and mail piece are vertically inverted. Additionally, drives associated with opening and closing the clamp to acquire, and unload mail pieces are included.

FIG. 1A illustrates a sorter 100 according to an embodiment of the present invention, during an initial sorting stage. All mail for one mail route is fed (singulated) at a feeder 102, scanned 104, thickness measured, loaded into clamps at a loading station 106 and inverted, and then put in a queue 108 for loading into the sorter. An operator, which might be the mail carrier, does video encoding (not shown) while mail is being fed. Once mail is sorted, the clamps are released, and empty clamps are returned to the loading station along a return path 110.

Figure 1B:
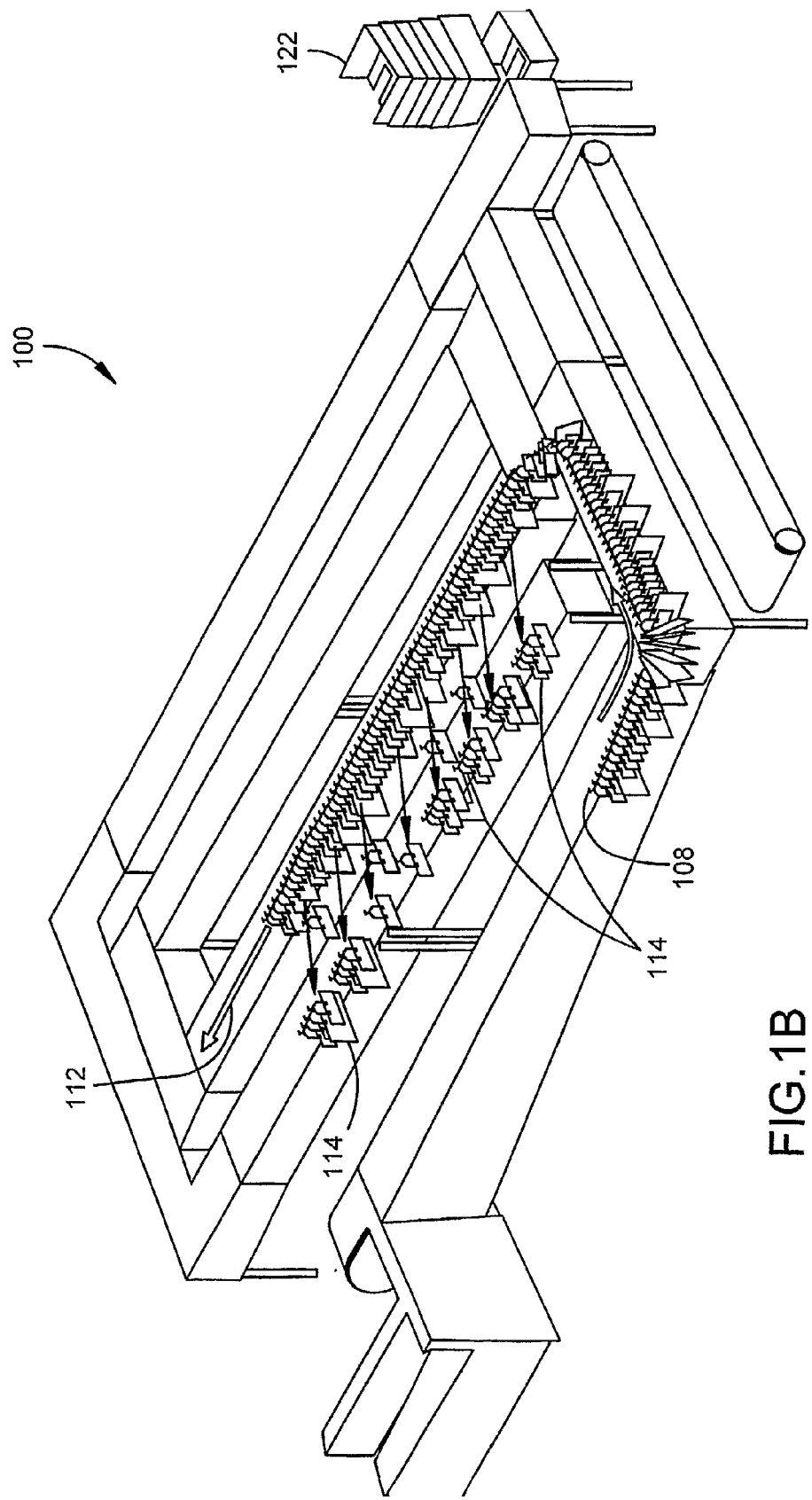
Figure 1C:
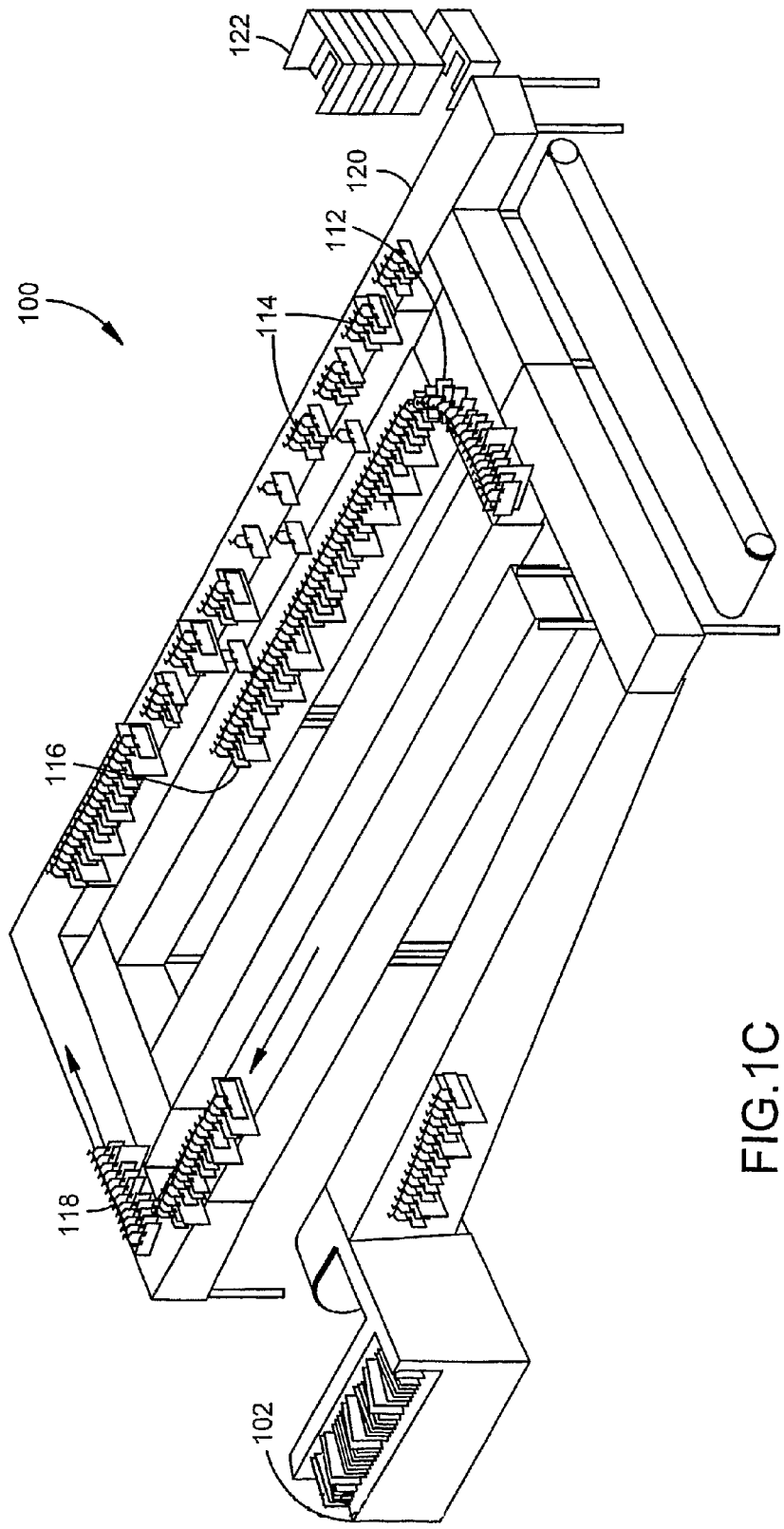
Figure 1D:
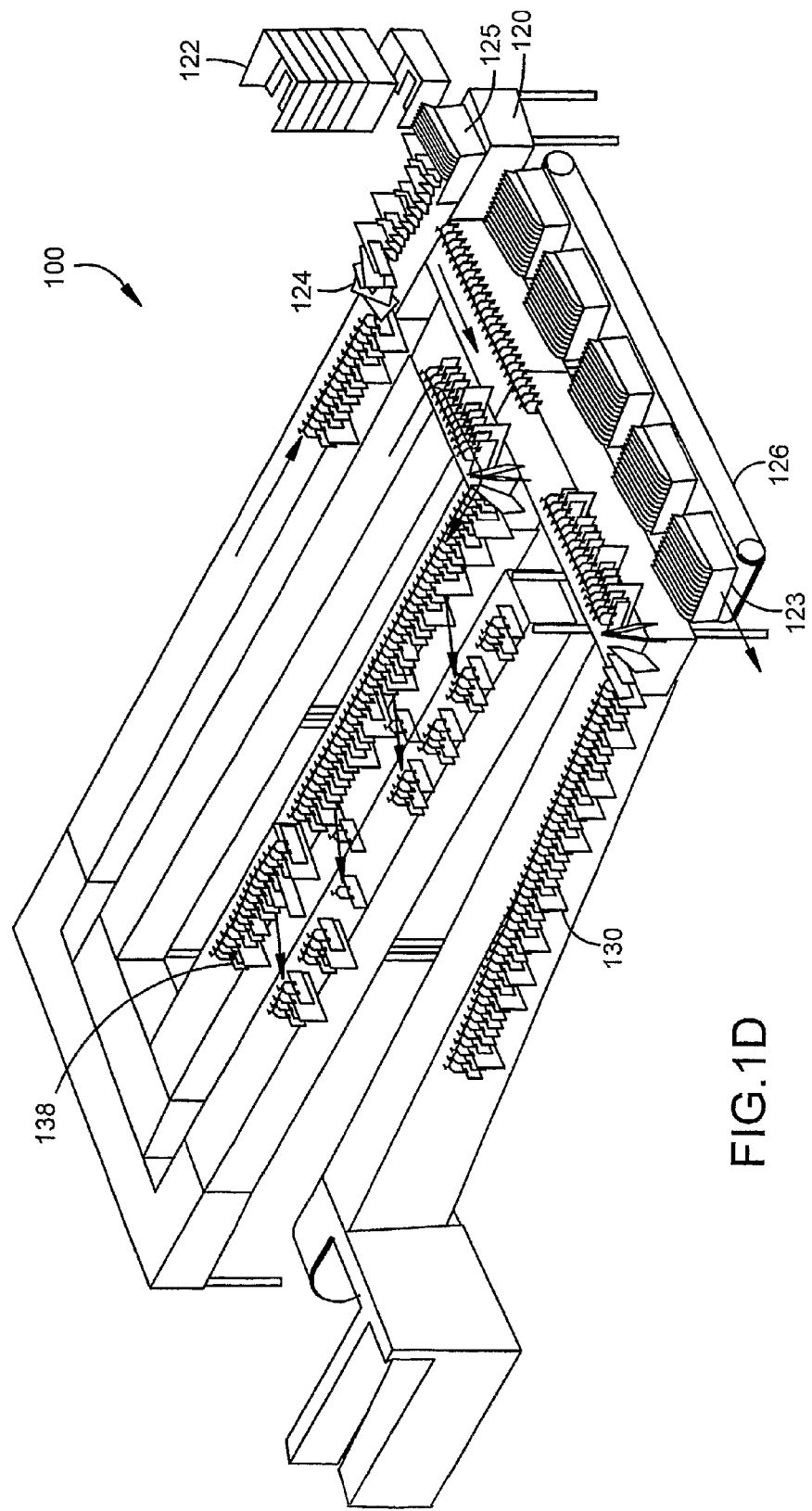
Figure 1E:
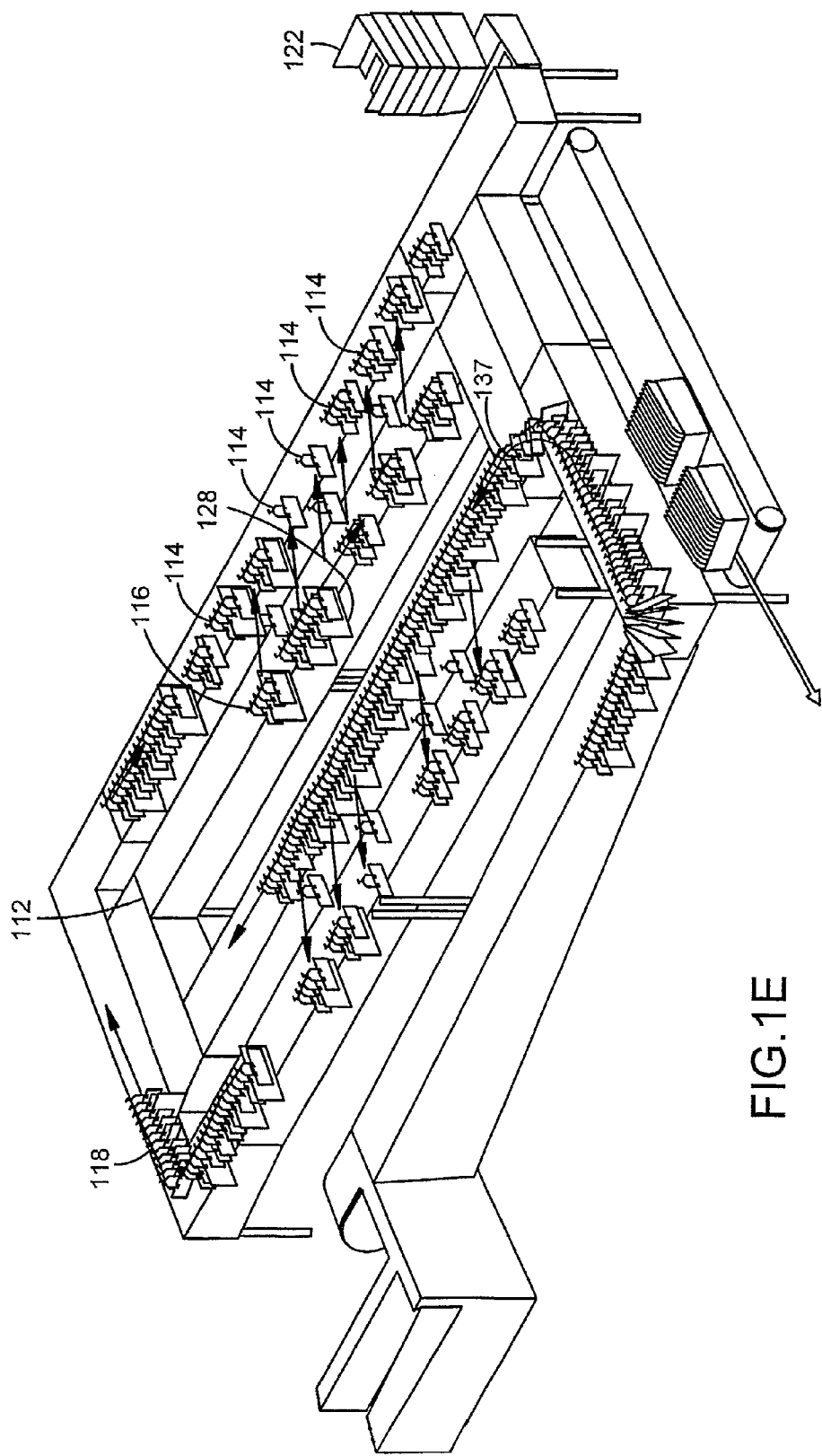

FIG. 1B illustrates mail advancing from the feeder queue 108 to a recirculation path 112, and mail is sorted into a plurality of sorting stations 114. Subsequently, as seen in FIG. 1C, unsorted mail continues to re-circulate along the inner racetrack 112, and more mail pieces are sorted into the sorting stations 114. After the trail edge 116 of the unsorted mail passes each sort station 114, the sorting system begins compressing (i.e. removing spaces between) the sorted mail 118 and moving it along the sorted mail path toward the unload/traying station 120. While this is happening, mail is loaded for the next mail carrier route into the feeder 102, and the feeding and clamping operation for this next route is accomplished while mail from the first route continues to be sorted and unloaded. FIG. 1D illustrates the subsequent unloading of mail into mail trays 122 at the unload/traying station 120. This mail, which was sorted during the first re-circulation, is rotated up 124, and moved directly into the tray 125. Filled trays 123 are then sent on a conveyor belt 126 toward storage or dispatch areas. Unsorted mail 128 is then transported additional times around the inner path, and is sorted into the next batch of addresses on the outer path to the address stations 114, while mail 130 for the next route is being fed, video encoded, and queued up. Empty clamps 135 continue to travel along the return path 110. FIG. 1E shows what happens next. Unsorted mail 128 for the first route makes its last pass around the inner racetrack 112 and into respective sort stations 114. After the trail edge 116 of the final piece of first-route unsorted mail passes each sort station 114, the sorted mail 118 is moved along toward the unload/traying station 120. As soon as the last mail for addresses of the first route is moved out of sorting stations, the previously queued mail 137 from the second route is moved into the inner racetrack, and sortation of that mail for the second route begins even while mail from the first route continues to be unloaded.

The system and method just described allows the sorter to operate with the major functions overlapping in order to reduce average job time. The queue station after the feeder enables the feeding for the second route to occur simultaneously with the sorting of the first route's mail. The compression of the sorted mail and advancement toward the sort station begins as soon as the last of the unsorted mail moves past the first sorting station—so that the transporting time to move the mail to the unload station occurs simultaneously with the sorting time. And, the unloading operation for a first batch of addresses occurs simultaneously with the sorting for the second batch of addresses. This results in a highly efficient system when multiple routs of mail need to be sorted.

Figure 2A:
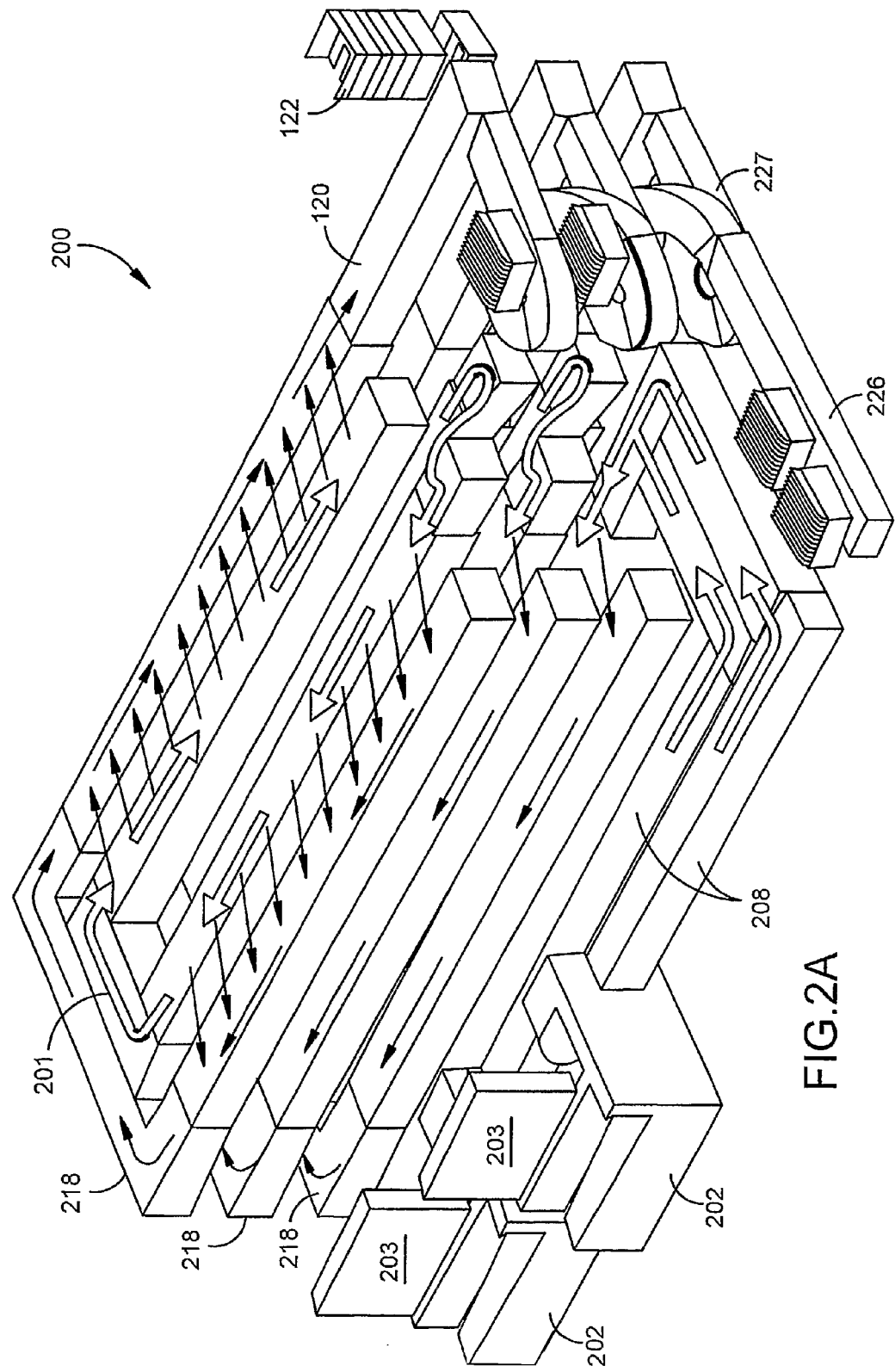
FIG. 2A is a perspective view of a multi-tier sorter in accordance with the instant invention.
Figure 2B:
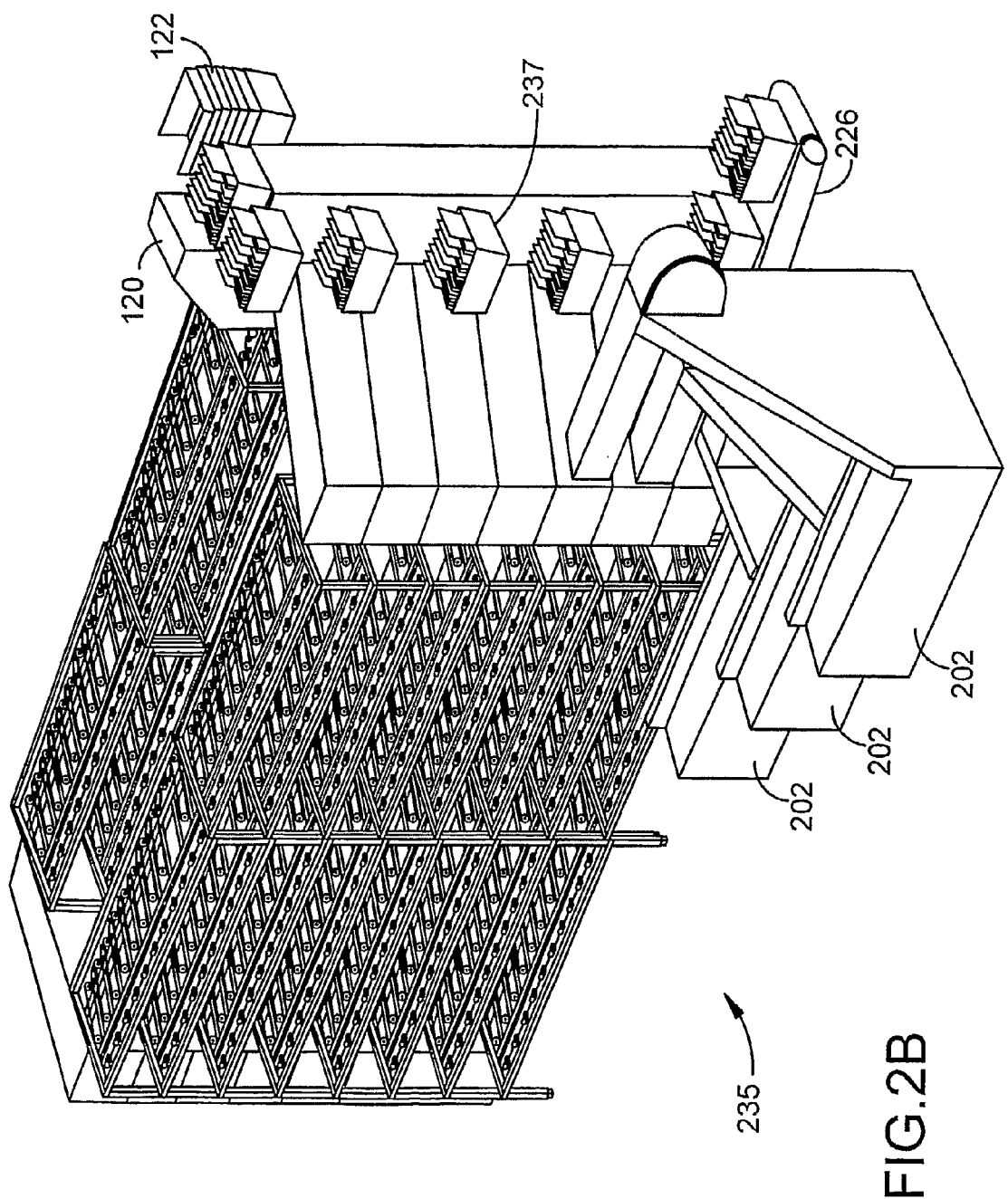
FIG. 2B is a perspective view of an optimized performance sorter.

The single tier embodiment just described can be expanded to multiple tiers, in which the operation is similar to a single tier system, except that central transport moves the pre-sorted mail upward from tier to tier in a rectangular upward spiral 201. As shown in FIG. 2A, this multi-tier sorter system 200 is intended to sort all addresses, on a single carrier route, in a single pass, although a return line could be added to the central spiral transport for multiple pass operation. The multiple feeders 202, video encoding systems 203, and queueing stations 208 shown in FIG. 2A enable the loading function to be overlapped, so that the next carrier route can be fed and video-encoded while the first route is being sorted. Each tier of the system has one U-shaped sorted mail path 218 which advances the sorted mail to unload stations 120. Once sorted mail is placed in the trays 222, the trays are transported out of the sorter system on a helical transport 227, and then on the flat conveyor belt 226. FIG. 2B illustrates an optimized performance sorter 235 similar to that in FIG. 2A, except that there are more tiers, and several other differences. Full mail trays 237 are transported vertically, instead of in a helical transport 227. The optimized performance sorter 235 has a capacity of 19,300 unsorted pieces on the inner rectangular spiral path. Mail can be diverted from this inner path to 800 address stations on the outer path, which is also a rectangular spiral path culminating in a single unloading station 120. This configuration includes multiple input feeding systems 202, which allow the mail from individual routes to be loaded into the sorter in rapid succession, and each route of mail makes only a single pass through the sorter in order to be completely sorted to delivery sequence for up to 800 addresses.

Figure 3A:
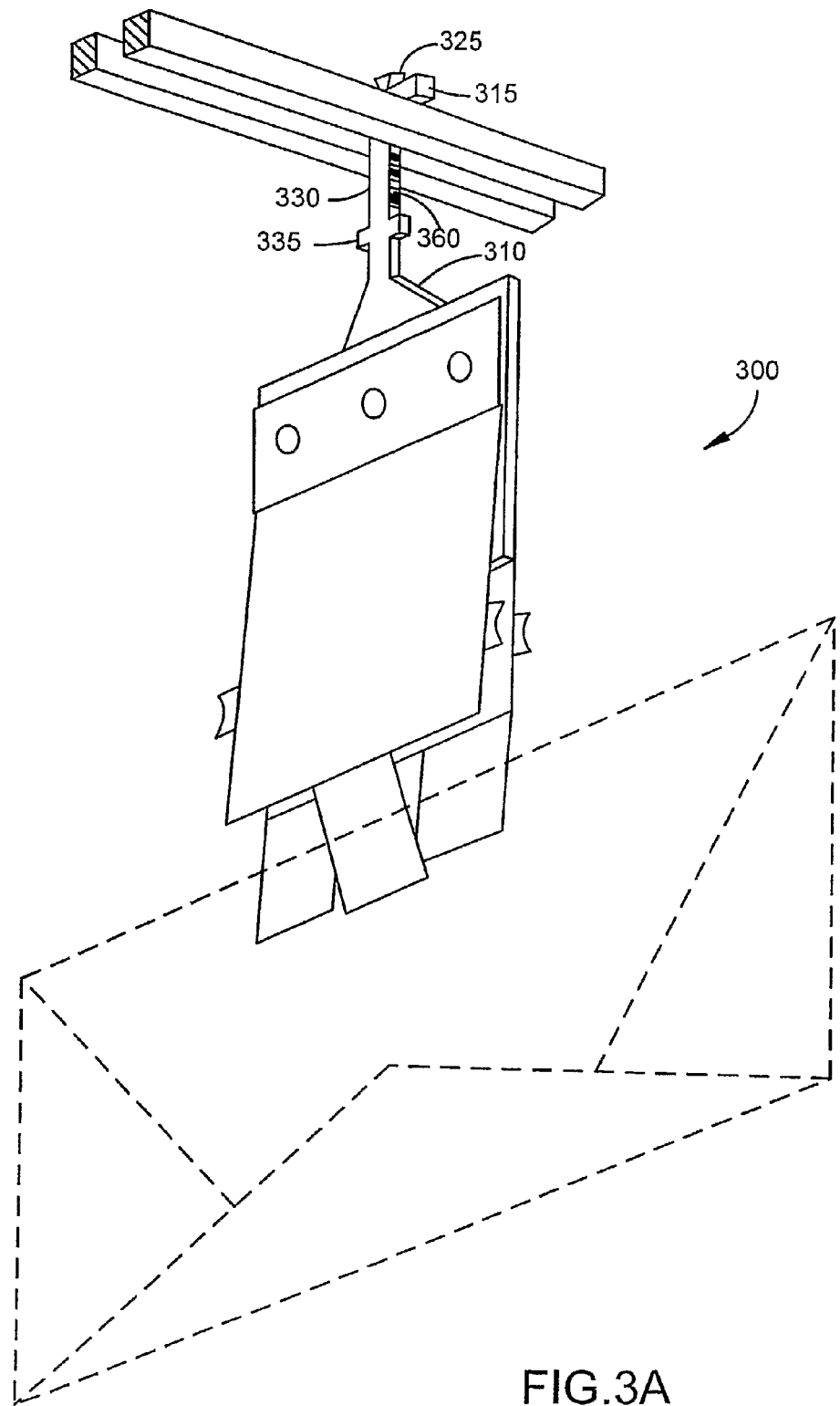
FIGS. 3A-3D are various perspective views of a mail clamp used in the sorters of FIGS. 1 and 2.
Figure 3B:
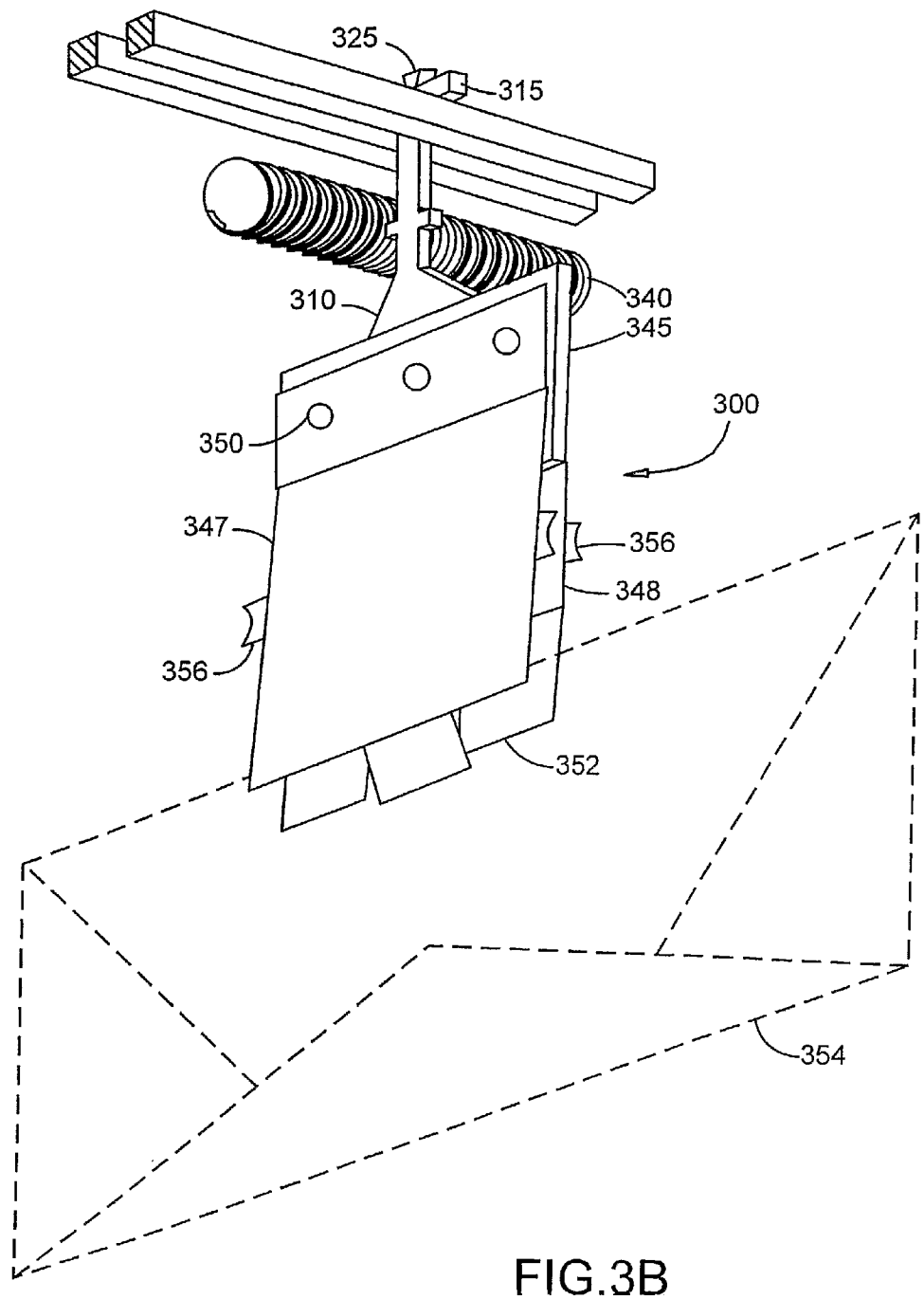

Referring now to FIG. 3A, the details of the clamp 300 are shown, including a member 310 having a number of noteworthy features. A T-section 315 is suitable for suspending the clamp from a support rail 320. A hook 325 is suitable for engaging a drive for moving the clamp laterally. A narrower stem section 330 having two features 335 suitable for engaging one of two lead screws 340 on either side of the clamp, as shown in FIG. 3B. A wider planar section 345 is suitable for mounting two flexible clamp jaws 347 and 348.

Figure 3C:
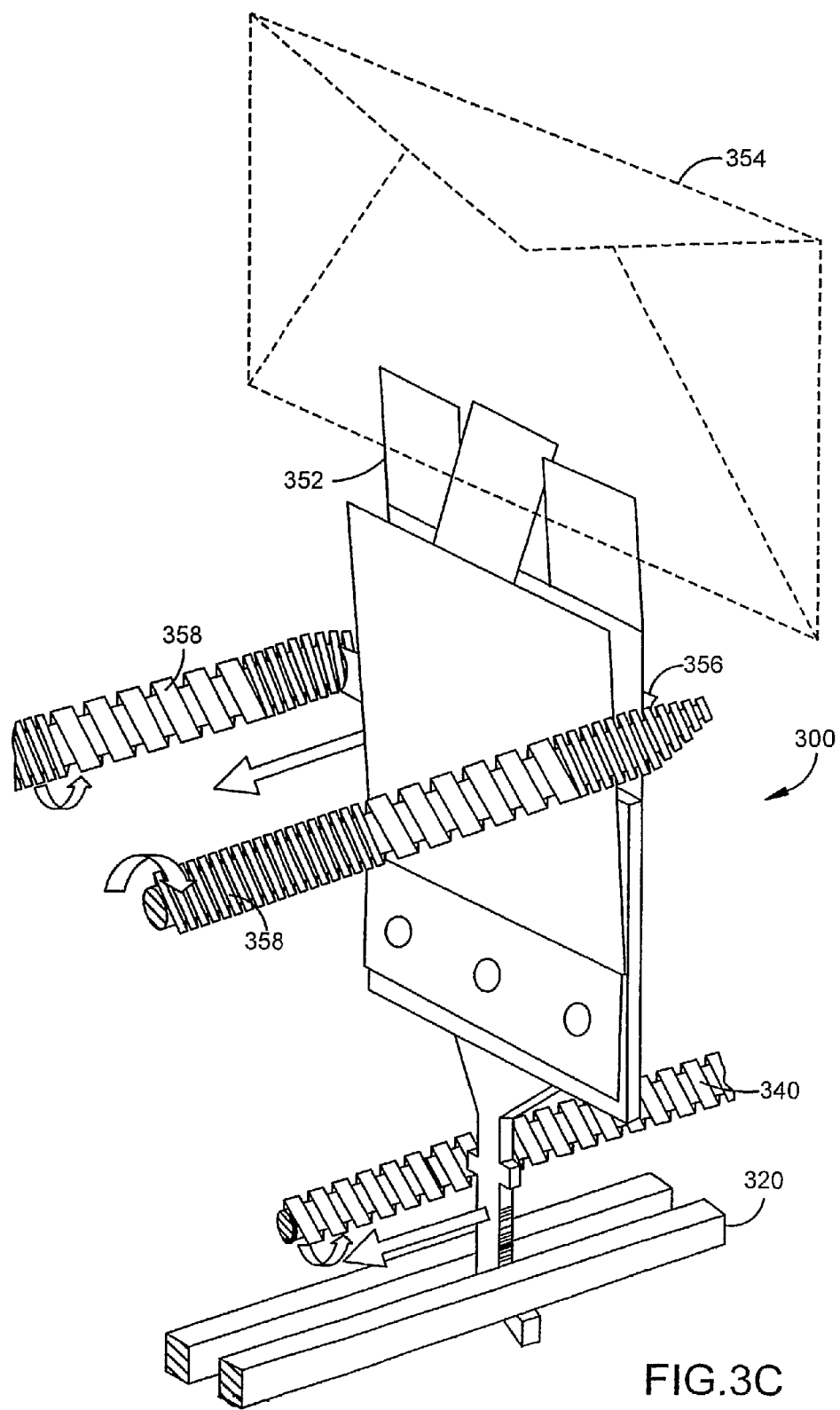
Figure 3D:
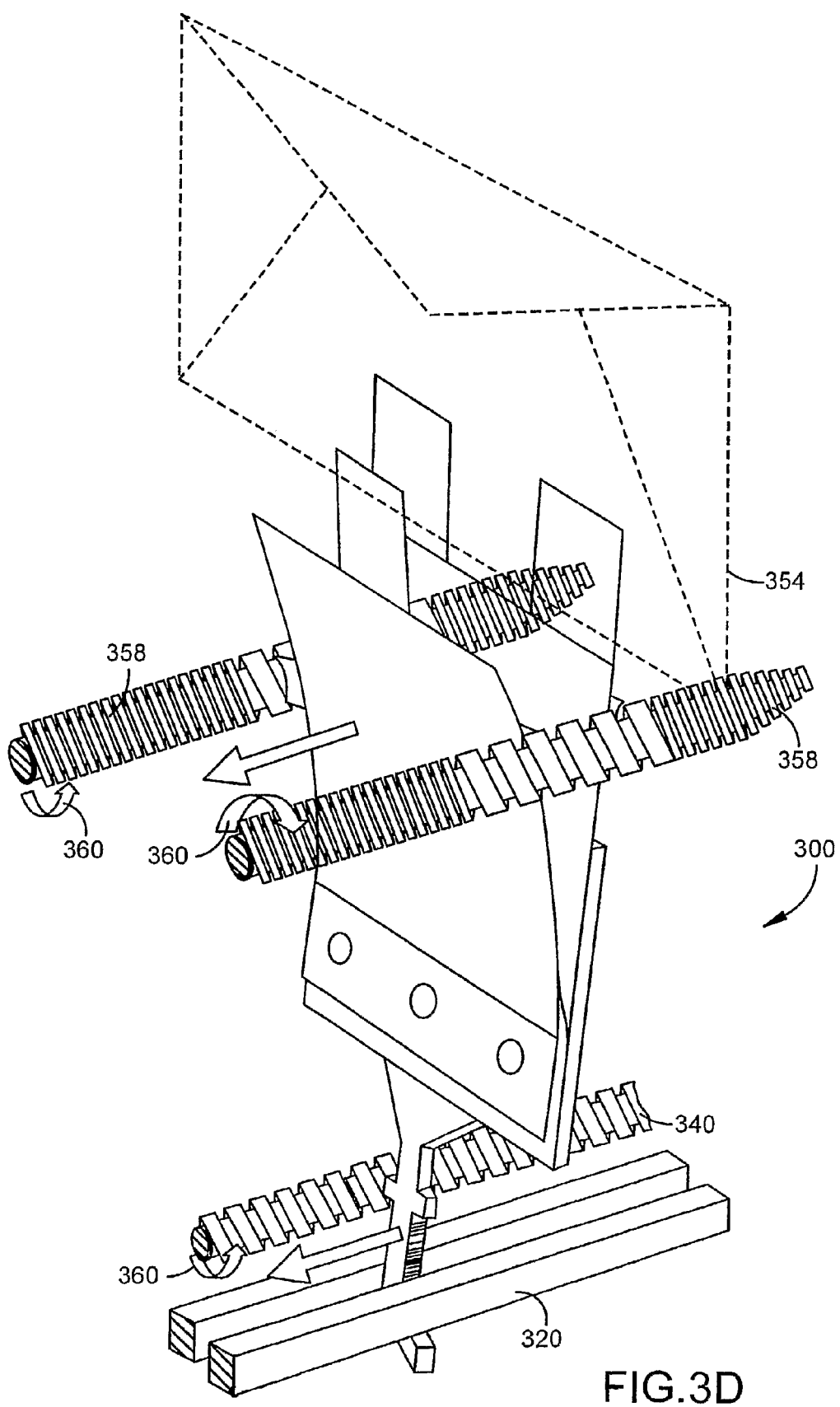

The two flexible jaw elements 347 and 348 have a number of significant features. A spring steel construction is capable of flexing a sufficient amount to hold a parcel of specified thickness (for example, 1" maximum thickness), and capable of exerting sufficient clamping force on the parcel to support its weight. A means 350 is provided to affix the two jaw elements to the support element 345. Bent tab segments 352 on the end of the jaws allow pieces as thin as a single sheet of paper 354 to be grasped by the jaws with sufficient force to support the mail without damaging it. Two tabs 356 on the edges of each of the jaw elements are suitable for periodically engaging lead screws 358 located on both sides of the clamp simultaneously for purposes of opening the clamp to receive or unload mail pieces 354, as shown in FIGS. 3C and 3D.

Additionally, as shown in FIG. 3A, each clamp 300 has a unique readable identifier 360 affixed to the clamp in order to identify the clamp and thereby identify the mail piece that has been associated with the readable identifier 360 on the clamp, at various portions of the sorter path. This unique identifier is shown in FIG. 3A as a bar code. It will be appreciated by those skilled in the art that many alternate technologies could similarly be used to provide a unique identifier for each clamp, including embedded RFID chips or other electronic identifying means.

Figure 4:
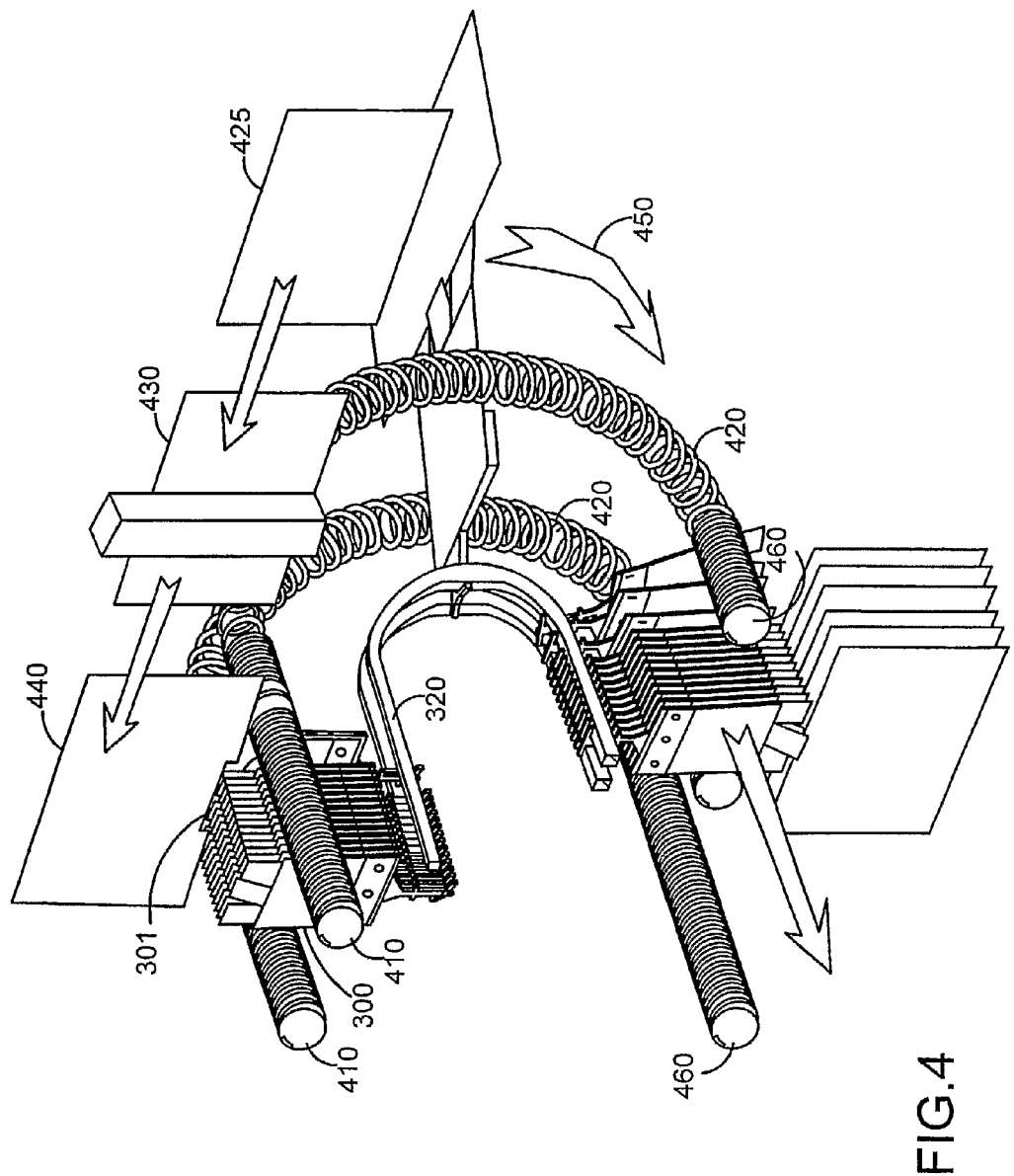
FIG. 4 is a perspective view showing the feeding, reading, centering and clamping operations by the mail clamp of FIGS. 3A-3D.
Figure 5:
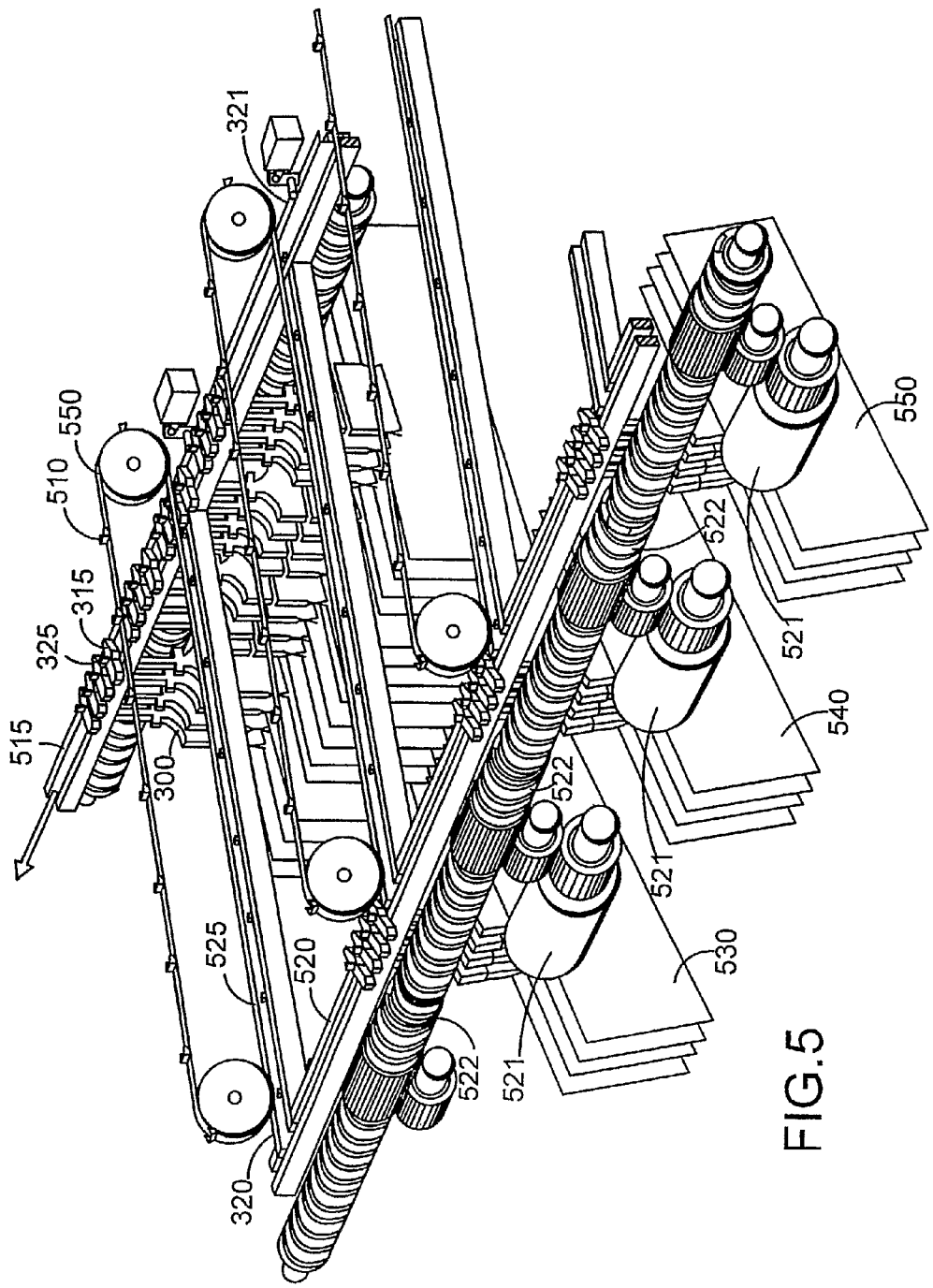
FIG. 5 is a schematic of the sorter of FIG. 1 showing mail pieces being sorted by diverting to a second path in accordance with the present invention.

The clamp of the present invention is propelled though the sorter by a number of different drive elements. These include the following. The fixed pitch lead screw 340 shown in FIG. 3B, having a pitch of 0.2". The tabs 335 on the stem of the clamp engage the lead screw 340 at any appropriate pitch between clamps (depending on the thickness of the mailpiece being held by the clamp), to accommodate a variety of mail piece thicknesses. A timing belt 505 shown in FIG. 5, with a plurality of hooks 510 affixed thereto for purposes of engaging a complementary hook 325 above the t-section 315 of the clamp 300. A solenoid driven lift segment of the support rails 320 lifts the entire clamp a small distance which allows it to be engaged by the hooks 510 on the timing belt drive 505. The timing belt drive moves the clamp laterally when it is desirable to remove it from a line of random mail pieces and re-engage it with a second lead screw drive associated with sorted mail pieces. A pair of support rails 320 for supporting the clamps through the entire pathway of the sorter, including for purposes of inverting the mail pieces in a vertical plane as shown in FIG. 4. In this sorter system, the support rail paths 320 include horizontal and linear, horizontal and lateral, curved in a horizontal plane, curved in a vertical plane, curved in a path that elevates the clamps from one level to the next, and helical in a path around a lead screw for purposes of inverting the mail pieces in a vertical plane, as shown in FIG. 4. A combination of lead screw segments 410 and coil spring segments 420 drivingly connected with one another, with equivalent pitches (of approximately 0.2"), are arranged so as to reduce the need for precise alignment when driving the clamps from one sorter module to the next, or to change the clamp direction of motion from linear to non-linear. As shown in FIG. 3C, a pair of lead screw segments 358 having variable pitch and variable diameter to engage four tabs 356 on the jaws segments of the clamps for purposes of opening the jaws for either loading or unloading mail pieces into or out of the clamp. Actuator elements associated with the lead screws for providing rotational motion 360 as shown in FIG. 3D. Multiple actuator elements 521 associated with multiple segments of lead screws 522 capable of acting in concert to selectively advance driving control of the clamp tab engagement from one segment to the next is shown in FIG. 5. A control system algorithm capable of working with multiple actuator elements driving multiple lead screw segments for purposes of removing empty spaces between mail bearing clamps in the sorted mail portion of the sorter.

As mentioned, FIG. 4 illustrates inversion of mail pieces, as part of the loading process. Before being placed in a clamp, a mail piece is singulated 425. It is then scanned, its address is read, and it is measured for length and thickness, all at the stage 430. Then, the mail piece is centered 440 in the jaw of the clamp 301. The jaws close, and the clamp with mail piece are inverted 450 for entry into the rest of the sorting system.

The empty clamps 300 are transported to the loading point by the lead screws 410, and at that point the pitch of the lead screw increases to open the jaws of the clamp. Once the mail piece is inserted in the jaws, the lead screw pitch narrows to close the clamp and capture the mail piece. The lead screws 410 mate to the coil springs 420 for inverting the clamped mail 180 degrees, thus turning it upside down for transporting and sorting operations. The coil springs 420 mate to two more lead screws 460 to complete the mail inversion. Drive control of the clamps is passed from the bottom two lead screws to a long lead screw, which transports the clamps and mail past all the sorting stations.

FIG. 5 is a schematic of the sorter of FIGS. 1A-2B, and shows a number of additional significant features of the invention. As mentioned, the timing belt 505 has a plurality of hooks 510 for purposes of engaging a complementary hook 325 above the t-section 315 of the clamp 300. A solenoid driven lift segment 321 of the support rails 320 lifts the clamp a small distance which allows it to be engaged by the hooks 510 on the timing belt drive 505. The timing belt drive moves the clamp laterally when it is desirable to remove the clamp from a line 515 of random mail pieces and re-engage it with a second drive associated with a line 520 of sorted mail pieces. Mail on the line 515 is in random order, and is transported at 2 inches/second. Mail pieces are moved on a lateral line 525 at 8 to 16 inches per second. Once moved laterally, the mail is separated according to destination, with mail 530 for address A being separate from mail 540 for address B, which of course is separate from mail 550 for address C.

Figure 6A:
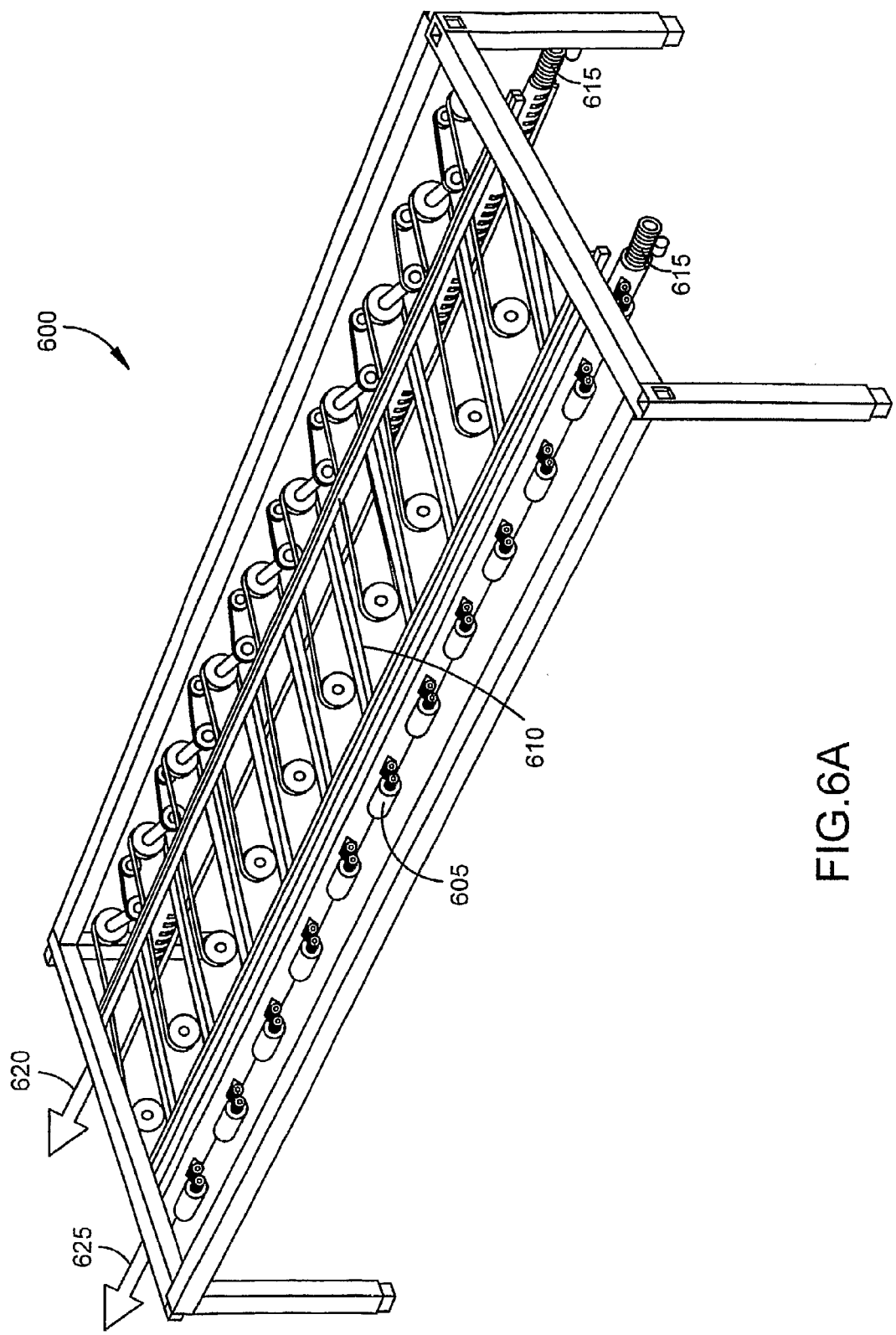
FIG. 6A is a perspective view of a mixed mail binless sortation module in accordance with the instant invention.
Figure 6B:
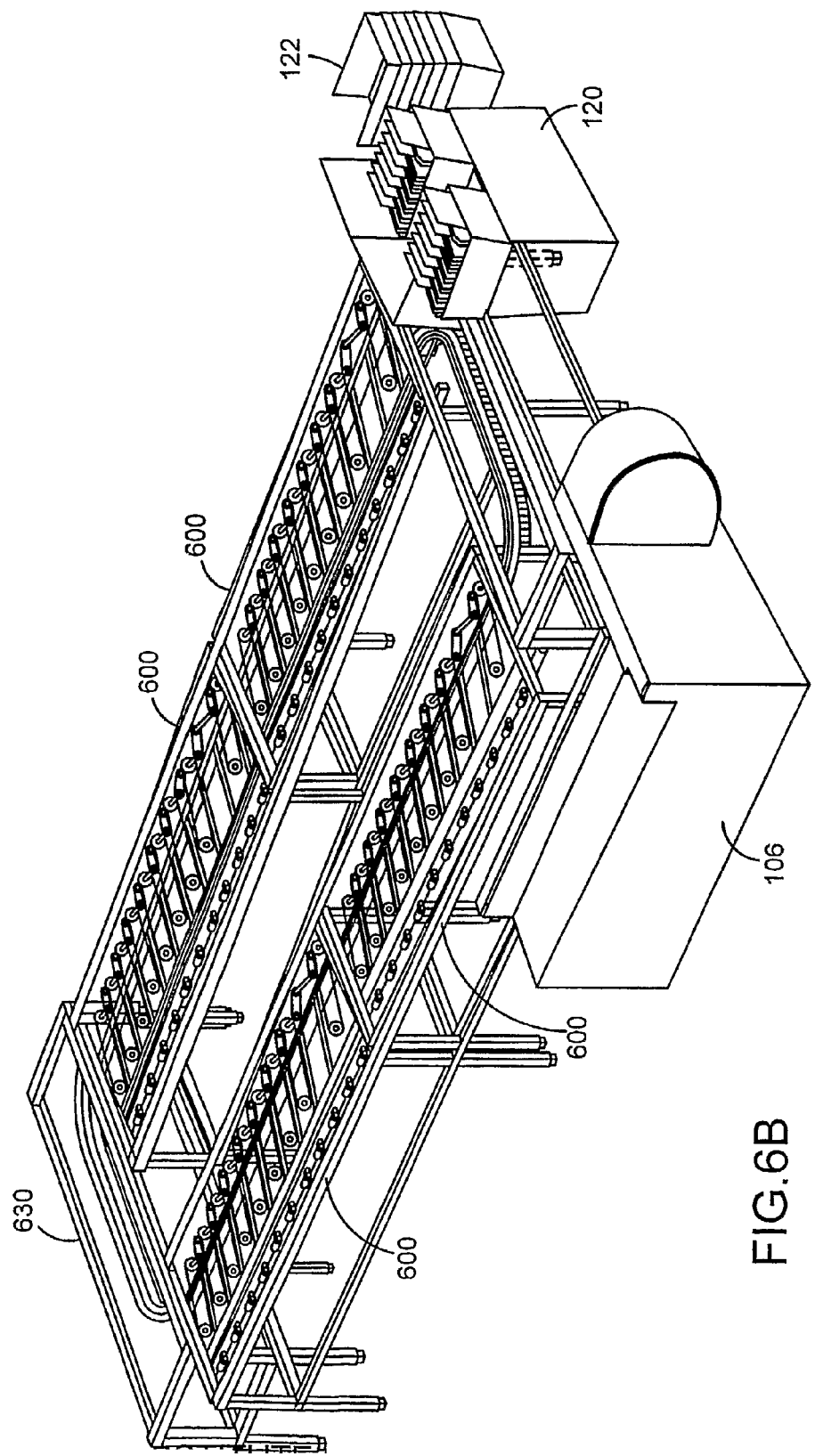
FIG. 6B is a perspective view of a basic sorter configuration.

FIG. 6A depicts a mixed mail binless sortation module 600. This module stores and transports mail pieces, and the illustrated module can handle 360 mail pieces for 15 sorting stations, each having a 10 piece capacity. Those sort stations can be linked to increase capacity per address; link any two stations to sort 34 pieces per address. Link three stations to store 58 pieces per address, et cetera. As shown in FIG. 5, a space is left between batches of mail 530 and 540 in order to move additional mail pieces across transport 525 and add them to the batch of mail stored at 530. The gap between batches of mail enables the leading edge of mail pieces to move between batches 530 and 540 without this edge colliding with the edges of mail pieces already stored in batches 530 and 540. When two sorting stations are linked together in order to increase the storage capacity, only one gap is required. The space previously used as the second gap can now be used for storing additional mail pieces. Typically, a gap is about 2.8" wide. When this gap is filled with mail pieces on clamps at a pitch of 0.2" per clamp, then 14 additional mail pieces can be stored in the gap. So, when two storages areas are linked together, the capacity does not increase from 10 to 20 pieces. The additional 14 spaces in the gap are also included to increase the storage space capacity from 10 to 34 pieces. Modules such as the one shown in FIG. 6A can be clamped together so that mail is passed from one to another module (see FIG. 6B), and they can also be stacked to create up to 10 layers of sortation (see FIG. 2B). The typical maximum mail piece dimensions for this module would be 12" tall, 15" wide, and 1" inches thick. The module includes drives 605 for individual sort stations, and transition paths 610 to those sort stations. A helix spring transition 615 is provided between drive screws of adjacent modules. The module has an output for unsorted mail 620 and also an output for sorted mail 625. As mentioned, FIG. 6B illustrates the basic sorter configuration, having various different modules connected together, including the four modules 600 of the type shown in FIG. 6A. This basic sorter configuration has a capacity of 1950 pieces, according to this embodiment of the invention, with 80 sort stations 605, the unload/traying station 120, trays 122, a loading station 106, and a turn module 630 that includes two coil springs and a straight segment of lead screw to turn stored mail pieces 180 degrees.

Automated Sorter Unloading and Unique Mail Tray Configuration:

With current mail sorting technology, often the task of unloading the sorter bins—either to re-load mail back into the sorter for a second or third pass, or to load the sorted mail into mail trays for delivery—is a manual process. The cost of operating automated sorting equipment is dominated by the cost of labor, especially the unloading (sweeping) process. This cost contributes to the cost of postage because it is a significant cost of processing the mail.

The challenges of developing a stacking system that automatically unloads mixed mail directly into a mail tray are huge. Prior art is likely to be limited to stackers that work only when the sizes of items to be stacked are relatively uniform (letters or flats, but not intermixed.) These stackers typically take stacked or shingled mail and transport it to the edge of a transport belt, and cascade it into a tray below. For these limited size stackers, the drop distance is limited to slightly less than the height of a typical piece. With mixed mail stackers, however, the sorted mail to be unloaded includes all sizes of mail intermixed in a random fashion. There is no obvious solution for how to cascade the mixed mail from a transport on which the bottom edges of the mail are registered on the transport (as is typical in conventional sorters) into a tray in which the bottom edges of the mail are again registered to the bottom of the tray. With the typical cascading method, the drop distance for the mail must approximate the tallest piece of sorted mail. Thus, there is a high probability that when a shorter mail piece is stacked, the next piece will fall down on the top edge of the previous piece, thus making an untidy stack and probably putting the sorted mail pieces back out of order. It is imperative to keep the mail pieces in the correct order, or the entire sorting operation was a waste of time.

Additionally, the current mail trays used by the USPS have a limited life, and must be replaced frequently. This cost is also contributes to the cost of postage, albeit a more minor contribution. These current mail trays are also awkward to transport. Often, the weight of the mail in the tray will cause the middle of the tray to sag, which requires supporting the center of the tray with hands rather than using the two hand holds on the ends of the trays. It would be preferable to have more rigid trays that do not sag in the middle.

Finally, the USPS has two standard types of mail trays: one for letters, in which the mail is stood on edge in the tray; and the other for flats, in which the mail lays flat in the tray. These two types of trays are different sizes, and each is incompatible with handling the mail of the other type.

The following is a description of the auto-unload process, including the design of mail trays to be compatible with the automatic unloading process. Most of the manual labor required for sweeping the sorter into mail trays is eliminated, thereby saving the postal service billions of labor dollars each year.

The problems associated with cascading a row of mail into a mail tray are avoided by using the mail clamps to drive (escort) the mail into the tray, then releasing the jaws of the clamps once the mail is safely in the tray. Rather than depending on the mail to fall in a predictable fashion once dropped off the end of a transport, the mail is driven to the exact position in the tray where it will be stacked before it is released from the clamps. One benefit of the disclosed method is that the clamps are inverted before reaching the stacking area such that registered edge of the mail (the edge clamped by the clamps) is a very short distance above the bottom of the tray when the clamps are opened. In this way, the mail is in the correct position when released, and it has only a very short distance to settle into the tray. It cannot be mis-stacked, and the mail cannot be disordered from the properly sorted order.

Additionally, the design for the tray used in the present invention extends the life of the mail tray such that the trays do not have to be replaced as frequently, and improve the ergonomics of handling the trays. Both of these improvements will save additional costs to the posts. The trays can also be handled in automated processes for feeding empty trays into the unloading system, and transporting the filled trays to the loading dock.

The disclosed tray configuration will successfully contain the entire range of mail that can be handled by the sorter (postcards, flats, letters, brochures, periodicals, and parcels up to a maximum specified thickness such as 1"). All of these types of mail, randomly intermixed, are stacked in the tray in the sorted order. The mail is optionally stacked in the tray in the orientation preferred by the posts: either standing on edge, or lying flat in the tray. In either orientation, the addresses are face up so they can be read by the carrier. As will now be described in further detail, the present embodiment of the invention uses the first type of stacking—mail pieces standing on edge.

An automated sorted mail unloading system having mail clamps in which the clamps are inverted and driven directly into mail trays. Once in the correct position inside the tray, the jaws of the clamps are opened, thus releasing the mail when it is in its exact stacked position. The mail does not need to free-fall into the tray. Hence, what is disclosed is a full escort mail stacking system which stacks a wide variety of intermixed mail sizes without ever directly handling the mail pieces. The tray translates in a direction parallel with the mail path at a rate compatible with fill rate.

Figure 7A:
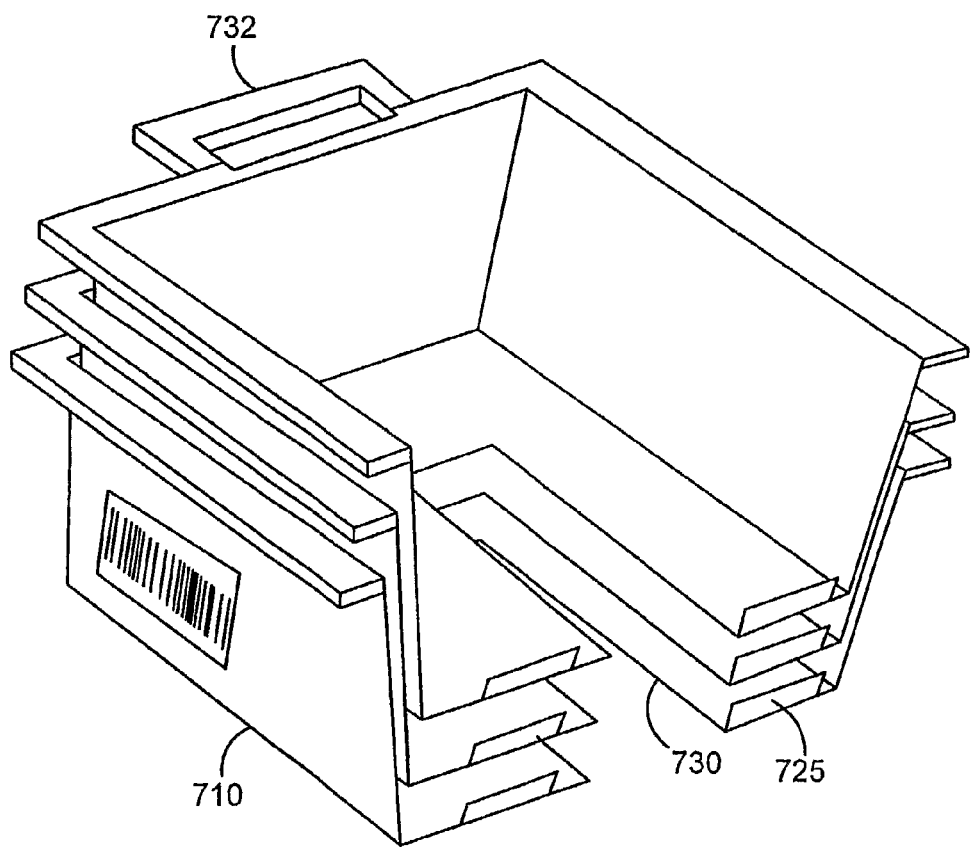
FIG. 7A is a perspective view of a stacking traying system used in the sorters of FIGS. 1 and 2.

FIG. 7A shows a stack 710 of the nestable trays. The invention includes a mail tray shape compatible with the automated unload system shown in FIG. 5B. Each tray 720 has three sides, one open end having a lip 725, and a slot 730 cut into the bottom to be compatible with the clamp path. The tray is fabricated from rigid materials to extend its life compared to current trays used by the USPS. The trays are stackable and light weight for easy transport, and include handles 732.

Figure 7B:
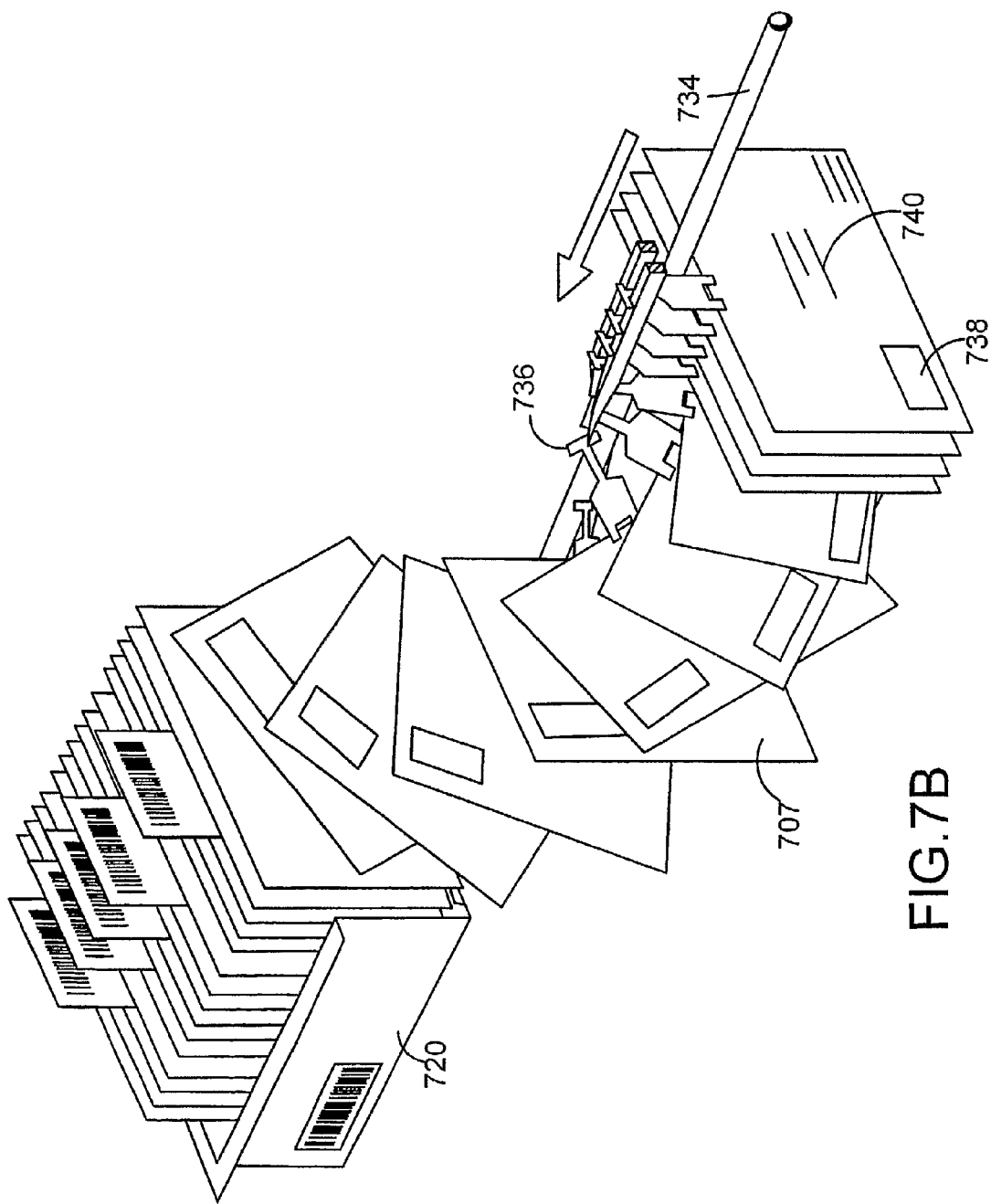
FIG. 7B is a perspective view of an auto-unload feature of the sorter of FIG. 1.

FIG. 7B shows how each mail piece 707 is placed in the tray 720. The lead screw 734 drives the clamps 736 from the sorting stations, with a typical mail piece including indicia 738 and address upside down. Mail is rotated radially while continuing to move in the same axial direction. Then the mail is stacked with the bottom edge 742 down, so that the addresses are right side up and easily readable by a mail carrier.

Figure 8:
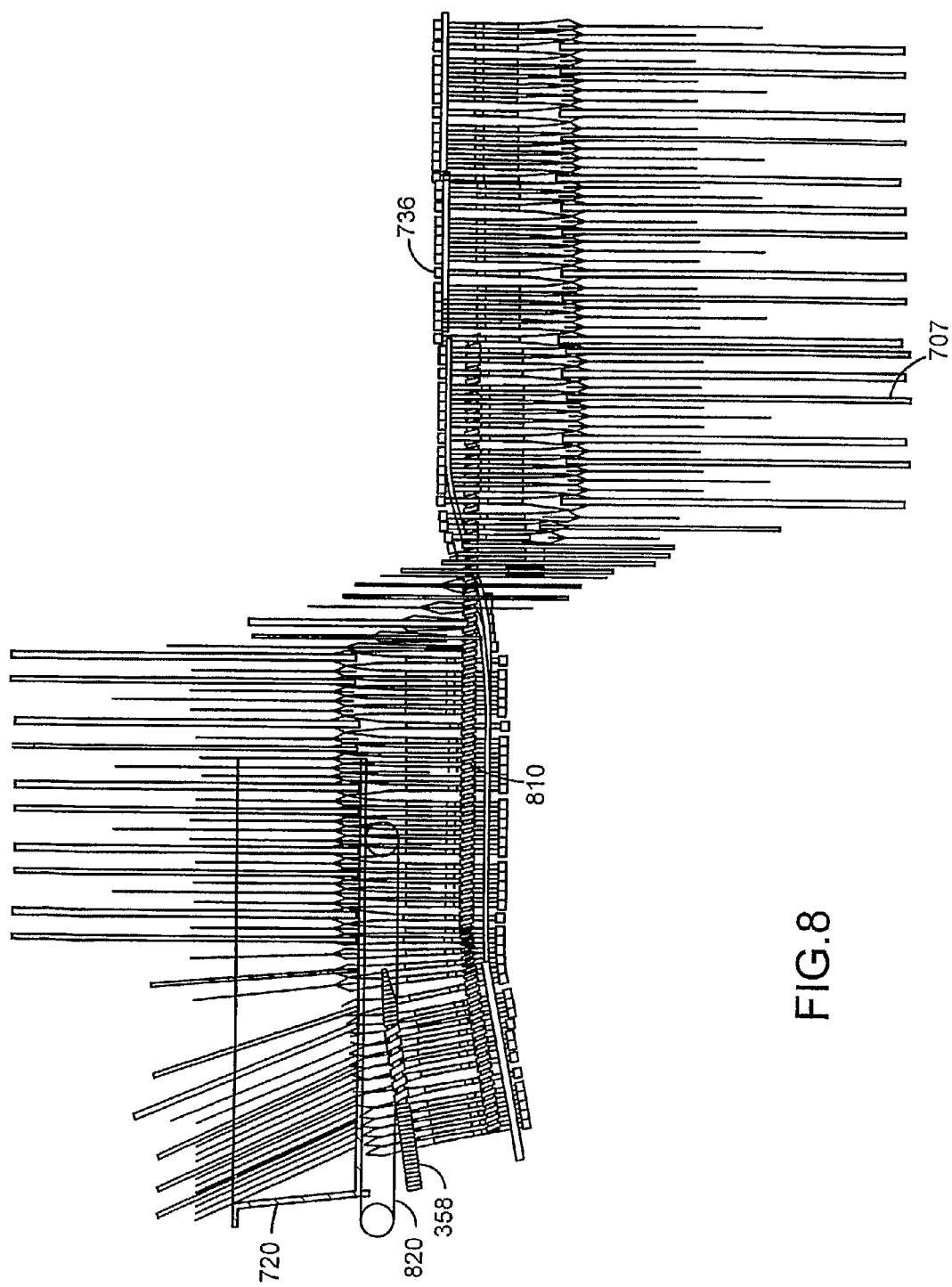
FIG. 8 is a schematic of the drive elements of an automated sorter unloading system, showing the auto unload sequence.

FIG. 8 is a schematic of the drive elements of the automated sorter unloading system that was shown in FIG. 7B. FIG. 8 details how this unload sequence appears, from a side view. Mail pieces 707 in clamps 736 has arrived from the right-hand-side, and has entered the inversion segment of the lead screw drive 810. Each clamp advances toward the jaw-opening mechanism 358. The jaws open as the clamps are moved below the bottom surface of the tray 720, which translates to the left along a belt 820, as the tray fills with mail.

The advantages of such an automated sorted mail unloading system are as follows. The system provides automated stacking of sorted mail of intermixed sizes and types directly into mail trays without the need for a mechanism to touch the mail pieces directly, thereby eliminating significant labor from the mail sorting process. The system provides a more robust mail tray that are easier to handle and will last substantially longer than the current mail trays used by the USPS. The system provides a tray capable of storing the entire range of mixed mail to be delivered by the carriers in an orientation in which the addresses are easily readable.

The elements of an automated sorted mail unloading system in accordance with the present invention include a sorting system in which the mail pieces are first clamped in a mail clamp, and the clamp is driven through the sorting paths by appropriate drive mechanisms. The output of the sorter and the input to the stacker is a line of clamps, each holding a mail piece, sorted into a desired sequence. This aspect of the invention also includes a method for inverting clamps so that the registered edge of the mail is the bottom edge of each piece; thus, the variable height of the mail pieces are on the top side of the row of mail pieces. Also included is a method for driving the clamps holding the mail through a slot in the bottom surface of the tray (i.e. the bottom surface in this embodiment), as well as a method for releasing the jaws of the clamps after the mail is in the correct position of the tray, and a method for moving the tray in the same direction as the clamped mail moves, and at a rate consistent with the fill rate. Furthermore, in this embodiment, the system comprises a clamp path in which a portion of the clamp holding the mail is initially above the bottom of the tray when the mail pieces are moved into the tray, and then the clamp drops to a position below the tray after the jaws of the clamps have been opened to release the mail pieces. The mail tray of this system has three walls, an open end with a lip, a base with a slot cut therein compatible with the path of the clamps, said tray capable of containing the entire range of mail sizes oriented on edge with the addresses oriented top side up so as to be easily readable. The mail tray is designed to be rigid, nestable, and stackable. An alternative tray configuration has four walls and a bottom, with a slot cut in one of the walls of sufficient dimension to be compatible with the dimension of the clamps. In this alternative, mail is moved directly into the tray and released from the clamps in an orientation such that the faces of the mail pieces are parallel with the bottom of the mail tray. This type of mail tray is also designed to be rigid, stackable, and nestable.

Single Pass Sorter and Delivery Scanner:

According to the system of the present invention, the location of mail pieces can be tracked using a clamp-based sorter and delivery scanner. It will be appreciated that with conventional mail sorting equipment in which the mail pieces are unloaded from the sorter and placed in mail trays by hand, the exact identity of the mail pieces in each tray is lost. By contrast, with the automated unloading invention described above, the identity of each mail piece going into each tray can be preserved, and associated in a data base with additional identifiers loaded into the trays or affixed to the trays.

The present invention includes an alternative method of tracking mail beyond the last scanner on the automated sorting equipment, and substantially reduces the amount of carrier time required to physically scan either the mail or the packets. Assuming that mail will not be bundled for each address, and therefore the carrier cannot scan a code or an RFID tag on each packet, the sorter could do one of two things.

First, the sorter could insert dividers to separate the mail for one address and the next, and these dividers could each have a unique bar code printed thereon, or an RFID tag affixed thereto. Since the sorter is configured to remember all the bar codes, planet codes, postnet barcodes, and any other information on the surface of each mail piece, the system software could link that information on each piece for each address with the bar code or RFID tag on the divider. So, the carrier would scan the divider rather than the packet.

The benefits of this approach include full capture of all available information about each mail piece delivered while having to scan only one item per address. The disadvantages are that the carrier will still have to scan once per address, which will take additional time, and therefore make the carrier less efficient. The previously disclosed concept of having an RFID reader capture the information (and provide audible alerts) still apply to this version, and this will save time but cost more capital investment. Another disadvantage is that the carrier must carry the additional weight of the dividers, and deliver them back to the sorting system for re-cycling.

Second, an interesting alternative is to eliminate the dividers and associate all of the information about each mail piece captured by the sorter with a bar code or RFID tag on the mail tray. So, for example, mail for 50 addresses might be loaded into a single tray. While the mail pieces are being stacked in the tray, the system logic would associate the information captured by the sorter for each mail piece being loaded into a tray with the bar code or RFID code on that tray. The carrier would then scan the code (bar code or RFID code) when the tray was emptied (indicating that all the mail for those 50 addresses has been delivered for a mounted route), or while loading a tray's worth of mail into the mail bag for delivery (indicating that all the mail for those 50 addresses is about to be delivered on a walking route.) In either case, the time of delivery is effectively identified within about an hour's time of actual delivery.

For this version, since the carrier already returns empty trays back to the DDU at the end of the route, no additional actions are required for this task as they would be for returning the dividers. Secondly, the total number of bar code scans is limited to the number of trays of mail per route, which is far less inefficient than scanning something at each address. Thirdly, the bar codes or RFID tags could be permanently affixed to the trays, thereby having a long life and saving money.

With either alternative, when the RFID technology is employed (either on dividers or on mail trays), the RFID reader could be a device on the mail truck, or a portable unit mounted on the carrier, or a portable unit employed at a temporary storage box for walking routes, which would capture and record the information when the carrier performs an ordinary movement. For walking routes, this ordinary movement might be an action such as picking mail out of a bag and switching it across the carrier's body from the left hand to the right hand—on a path that brings the mail (and divider) in closer proximity to the RFID reader. Or, it might be the action of moving the divider into a special pouch on the mailbag—and the information is captured by the RFID reader when each divider is stored there. In the case of RFID tags on mail trays on a mounted route, the reader could be located where the carrier places the empty trays, and the code read for each newly emptied tray stacked for storage. These concepts would further reduce the number of actions required of the carrier, and thereby provide the full tracking of the mail without making the carrier less efficient.

A method for capturing delivery time information for Intelligent Mail pieces sorted on the previously disclosed Single Pass Delivery Sequence Mail Sorter system. All the bar codes, planet codes, postnet barcodes, and any other scanned and stored information on the surface of each mail piece when it is fed into the sorter will be remembered after the mail pieces are sorted and loaded into mail trays, and the information for all mail pieces loaded into a tray will be associated with a bar code or RFID tag on the mail tray. Alternatively, the bar code or RFID tag could be on dividers inserted by the sorter to separate mail destined for each delivery point. The carrier scans only the code on the divider at each address, or the code on each mail tray when the tray is emptied—and thereby captures information on the approximate time each piece was delivered. In the tray case, the delivery time is isolated to within a short time window required to deliver one tray full of mail to the addresses for that mail. If RFID technology is deployed, the carrier need not take any extra actions to capture the information.

For the code-on-dividers version, this embodiment tracks all the mail all the way to the delivery point. It requires the carrier to scan only one item per address, but information is captured about all mail pieces delivered. If RFID tags are used, the RFID reader can be positioned to operate without any additional carrier actions, thus preserving the carrier's existing efficiency while capturing time-of-delivery data for all mail pieces.

In contrast, for the code-on-tray version, this embodiment tracks all the mail to the carrier's vehicle or mail bag when the carrier is within a short time frame of the delivery point. It requires the carrier to scan only one item per mail tray, but information is captured about all mail pieces associated with that tray during the sort unload process that have just been, or are about to be, delivered. If RFID tags are used, the RFID reader can be positioned to operate without any additional carrier actions, thus preserving the carrier's efficiency while capturing approximate time-of-delivery data for all mail pieces.

Carrier Video Encoding:

Currently, the USPS uses remote video encoding systems with automated mail sorting systems. Whenever the OCR system associated with the address reader on a mail sorter cannot find, read, or interpret an address on a mail piece, the image of the mail piece is transmitted to a remote site, where a human reads the address and keys in the correct information. The sorter sprays a code on the mail piece and moves the piece out of the main stream of mail pieces whose addresses are readable by the OCR system. Sometimes this temporary storage for the unreadable mail piece is a long serpentine transport, and sometimes it is a sorter bin. Once the video encoded information is interpreted by a human being and transmitted back to the sorter, the stored mail pieces must be re-introduced back into the main sorter transport—either automatically (if the unreadable pieces were stored in a serpentine transport), or manually unloaded from the storage bin and re-fed into the system so they can be sorted.

The problems with that prior art system include that it takes a relatively long time for the remote encoder to read and key in the correct address information. Thus, the capacity for storing unreadable pieces must be large enough to handle the total number of un-readable pieces. This adds cost, job time, and footprint to the sorter system. An additional problem is that, for systems intended to sort to carrier delivery sequence, the remote encoder is prone to more mistakes since the encoder must read and interpret street address and recipient information, and the encoder is not familiar with individual route details like the carrier for that route would be. Also, if we consider a system in which the carrier who will deliver the mail also operates the video encoding system for his/her own route, there are a number of logistics problems to be solved. The sorting is generally done at a centralized facility, and the carrier is generally at a DDU (destination delivery unit). With the very large sorters, multiple routes are sorted simultaneously—and organizing individual carrier availability for providing video encoding information would be difficult to schedule without delaying completing of multiple sorting jobs. The prior art system also has the drawback that, if a postal employee uses key-stroking skills, they are often paid at a higher rate than carriers are paid. Expecting carriers to conduct key-stroking activity while engaged in video encoding operations may require changing the union rules, or require higher pay for the carriers. Additionally, most carriers would probably need training to become "computer literate" to operate the system.

The present invention's full escort mixed mail sorter using mail clamps is small enough to be deployed at the DDU facilities, where the carriers report to work. Many encoding errors would be avoided if the carrier, who is familiar with the route, provided the correct address information for non-machine readable mail pieces. Rather than expect the carrier to be computer literate in order to keystroke in the correct information, this disclosure proposes a visual display of the individual carrier's actual route showing all delivery points, and a "point and click" method of entering the correct address information. The sorter interprets the graphic location clicked on by the carrier into address information, and automatically associates this correct information with the mail piece previously fed into the sorter. With the sorter described above, there is no need to print new information on the envelope. This approach will be substantially faster than the key-stroking method, and is likely to be more accurate when done by the person most familiar with the route, rather than a remote encoder. If the point and click method is used, the union rules related to key-stroking skills may not apply.

Many European posts are far more interested in purchasing carrier sequence sorters for deployment in the DDUs rather than in central sorting facilities. A remote encoding infrastructure is not needed, and the carrier knowledge of the route is used most beneficially in completing the sorting task. The final sort of unreadable mail pieces is completed automatically.

Figure 9:
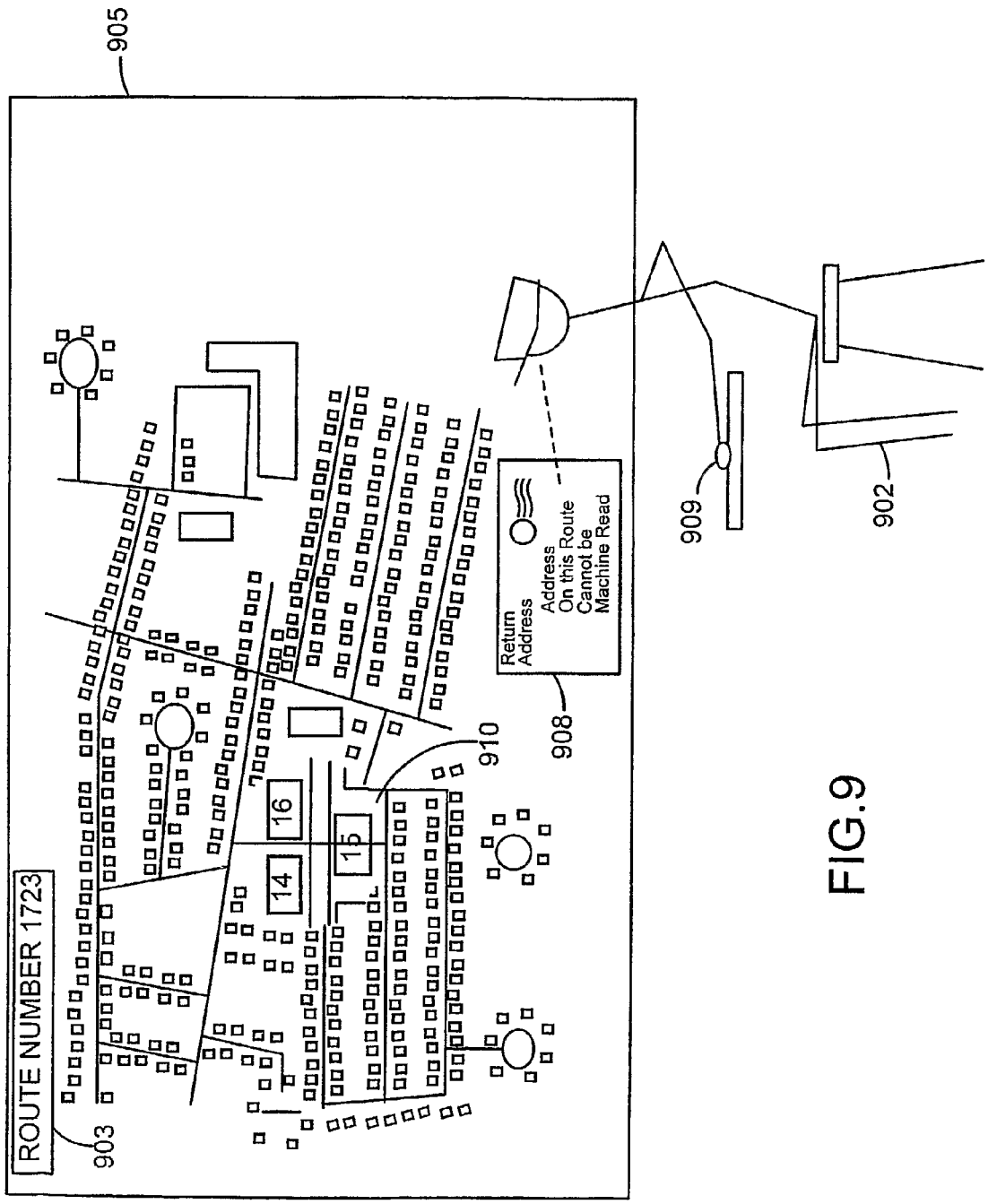
FIG. 9 is a diagram showing point and click local video encoding by an operator.

FIG. 9 shows a simple method and system for a postal carrier or clerk 902 to enter correct address information for non-readable mail in a carrier delivery sequence sorter. The carrier enters a route number 903, and a large screen 905 displays the route map, with icons for each delivery point on the route, located at the carrier's normal place of work. A window on the screen displays the captured image 908 of a mail piece for which the system could not read or interpret the address information. A workstation enables the carrier to read the captured image 908, and the carrier uses a mouse 909 to point a cursor to the correct delivery point on the displayed route map, and clicks a mouse to indicate the correct address. The cursor magnifies a local image 910 wherever the cursor is pointed, so that the carrier can easily read individual addresses. Once the carrier click on an address, the mail piece is sorted to that address, and the next unreadable address image 908 appears. A control system and software associates the mouse click with the correct delivery point, and appends that information to the unreadable mail piece location in the sorter. This system does not require the carrier to be computer literate.

No information needs to be printed on the mail piece. The system software associates the address associated with the screen icon identified as the correct address by the carrier with the unique identifier on the clamp holding the mail piece in the sorter. The piece can then be sorted to the correct delivery point along with all the mail pieces that were machine readable. The unreadable pieces remain intermixed with the readable pieces (without moving them to a storage location), and are sorted to the correct location (using the appended information from the mouse click) along with and in the same time frame as all the readable pieces.

As mentioned, the screen image can be enlarged in the area immediately surrounding the cursor icon, in order to display the entire route on a single screen, but improve readability and cursor pointing accuracy. A further embodiment associated with this method includes another display innovation. For buildings with multiple delivery points such as apartments and office buildings, clicking on the icon representing the building causes the screen to display an enlarged view of all of the delivery points within the building. The carrier can then add an additional click on the correct address displayed on the enlarged view of the delivery points within the building.

Figure 10:
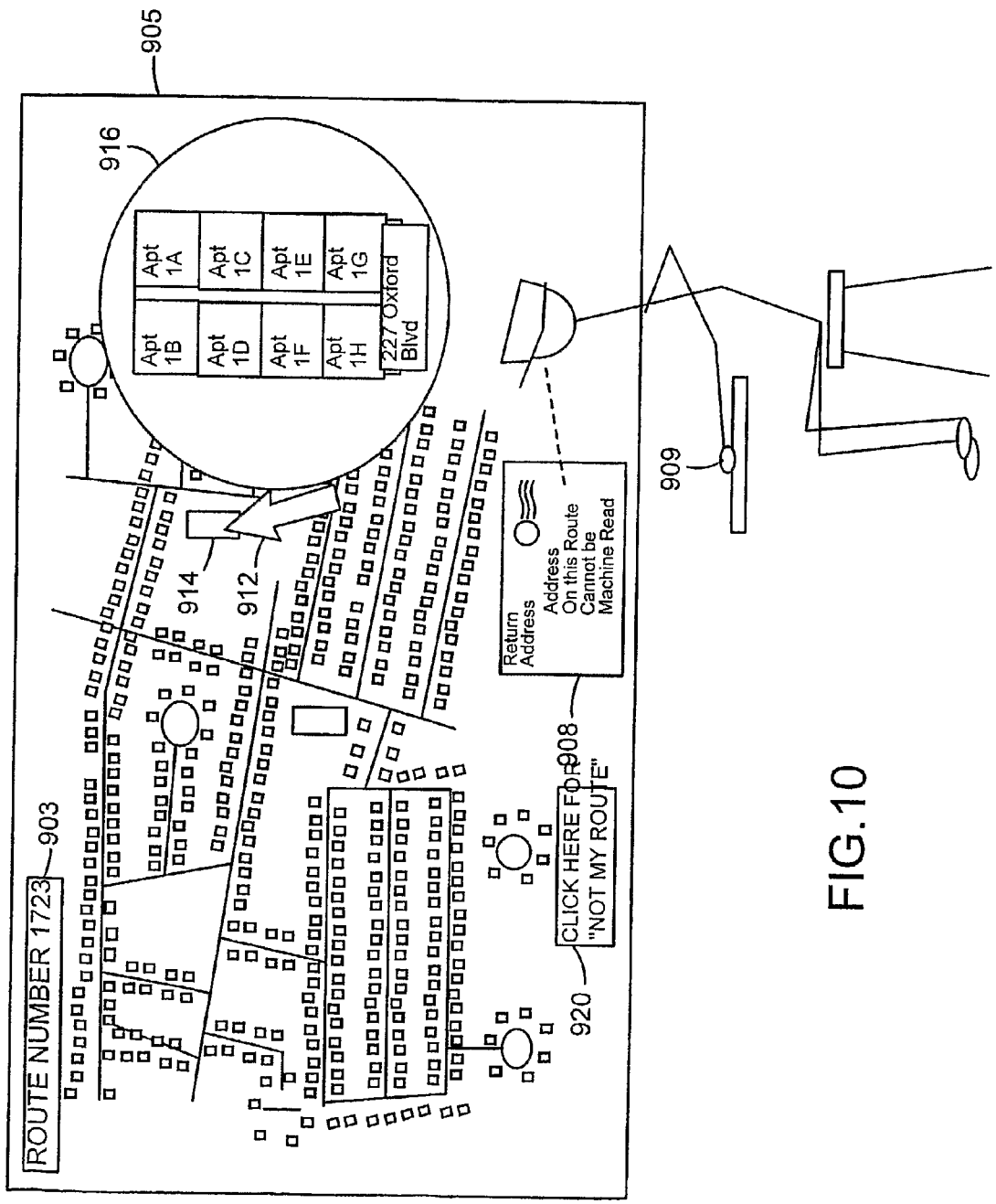
FIG. 10 is another diagram showing point and click local video encoding by an operator for an apartment building.

This enhanced point and click system is shown in FIG. 10. If the carrier moves the cursor 912 to a large facility 914 then a window 916 appears having a detailed map of the facility, including delivery locations to click on. Alternatively, if the mail piece 908 has been mis-sorted to this rout 903, then the carrier can click on a "not my route" icon, and the mail piece is diverted accordingly.

This same display with point and click technology can further be used to hold mail at the DDU for postal patrons who are traveling, and automatically re-direct mail for postal patrons who have moved. The delivery point icons on the display map can be color coded to display the status of the postal patron (OK to deliver here, hold mail at the DDU, or forward mail to a new address.) The carrier needs only to point and click, and the sorter takes the appropriate action on the mail piece.

The advantages of carrier video encoding are as follows. It uses the route knowledge of the carrier to reduce errors. It is highly efficient in that it eliminates key-stroking for the correct address, which saves time and infrastructure. It occurs in real time while the mail pieces are being fed into the sorter. It may avoid higher pay for the carriers because key-stroking skills are not required. It automatically redirects mail if the patron is traveling, or has moved.

In order to interpret how this embodiment works with the carrier delivery sequence sorter, it will be helpful to remember some key facts from the basic single pass sorting concept.

As each mail piece is fed and scanned and introduced into the sorter, the sorter logic remembers the address of the mail piece and knows the exact location of each mail piece throughout the sorter paths. So, the information appended to the location of each piece could be either the address as interpreted by the automated address reader, or the address location associated with each icon location on the route map.

It will be noted that while the intent of this improvement is for use with the sorter described above, this embodiment could also be used in a conventional sorting system. For multiple pass systems, a code printer is normally used to spray a unique code on each unreadable mail piece. When the remote encoded information is available, it is associated with the code on the mail piece. The same system could be used with information provided by the carrier clicking address location icons on a large screen.

It will also be noted that while the preferred implementation is for sorting equipment located at a DDU, with the carriers who will deliver the mail providing the point and click identification of mail that could not be interpreted by an OCR system, there is also considerable benefit for systems in which the sorter is located in a centralized sorting facility, and/or the encoder operator is not the mail deliverer. For example, if the sorting equipment is located in a centralized facility, the captured address image could be sent to a different location and interpreted there by either carrier, and each identified address information sent immediately back to the sorter for association with the associated unreadable mail piece. Likewise, the persons operating the address identification system may also be others who are familiar with the individual routes, but who are not the actual mail delivery persons.

GPS Augmenting Carrier Efficiency:

The USPS is very interested in ways for making mail carriers more efficient. One source of inefficiency by the carriers occurs because they work a five day week, and mail must be delivered six days a week. So, at least one day each week, a substitute carrier must be used on each route to sort and deliver the mail. Also, when a carrier is on vacation, or calls in sick, substitutes must be used. The substitutes are not as familiar with the route as the assigned carrier, so they take longer to sort the mail, learn the route, and finger the mail while in transit.

This invention helps make carriers (and substitute carriers) more efficient by using the information gathered by the delivery sequence sorter, and information about the delivery route, combined with global positioning system (GPS) technology.

Carrier delivery sequence sorters capture information on every mail piece on a route, including how many pieces are to be delivered to each address. Additionally, information from special handling items (registered mail, etc), and parcels can be scanned for each route. This information along with route sequence information can be processed in association with a GPS system. The GPS system can either be a handheld device, or a GPS/map display having verbal instruction capability—such as currently available for cars. The GPS system gives substitute carriers precise information on the delivery sequence of the route while the carrier is delivering the mail.

Additionally, as the carrier approaches each delivery point, software and electronic audio gear associated with the GPS device tells the carrier how many mail pieces to deliver to that address. These might be verbal or visual prompts such as: "Three pieces of mail for this address", or "no mail for this address, so proceed to the next one", or "you have two special delivery items for this address."

This invention eliminates the need for the carrier to finger through the mail to determine how many pieces are to be delivered to each address, eliminates the need for the carrier to be familiar with the route, and eliminates the need to remember when special items and parcels need to be delivered to each address. Thus, it makes both the mail carrier and substitute carriers far more efficient.

These improvements eliminate backtracking to deliver missed items, and it reduces the amount of time the carrier spends at each address fingering through the mail to determine how many pieces are to be delivered to each address.

If this invention is successful in saving each carrier only 10 seconds at each address, and the average route in the US has 600 addresses, each carrier will save 1.67 hours delivering the mail every day. There are about 130,000 routes in the USA, and the mail is delivered 300 days each year. If the average salary for carriers is, say $45,000 per year, this savings of only 10 seconds per address will add up to savings of $1.4 billion each year.

Additional savings will be available to the USPS by enabling substitute carriers to be nearly as efficient as the regularly assigned carriers. The present invention will enable managers at the posts to optimize the routes on a daily basis based on the volume of mail for each address. So, on a given day, if one carrier has a heavier than normal amount of mail to deliver, and another carrier has a lighter than normal amount, the manager can dynamically modify the two routes so that each carrier has about the same amount of work to do. The GPS system along with the information on the mail to be delivered at each stop will enable the carrier with the lighter initial load to be efficient in delivering mail to a portion the other route. This will reduce overtime, and allow the managers to optimize workloads for all carriers each day based on mail volume information.

Key elements of this system and method include a GPS device combined with associated electronic gear having a loadable memory, a display, and/or possibly audible prompts, loaded with information about the carrier route and delivery sequence. The information loaded from the sorter also includes data on the number of pieces to be delivered to each address on the route. The system furthermore includes data from other items to be delivered (registered mail, parcels, etc), which is also loaded into the GPS system.

The GPS system guides carriers unfamiliar with the route through a delivery sequence that matches the delivery sequence into which the mail pieces were sorted. Additionally, at each stop, the GPS system advises the carrier on how many pieces are do be delivered, and if there are any special items to be delivered. Generally, if the GPS says "three pieces for this address", they will be the next three pieces in the tray or bag—so the carrier will not have to finger through the mail to read each address to determine the number of pieces. This system will save the carrier time at each stop.

Figure 11:
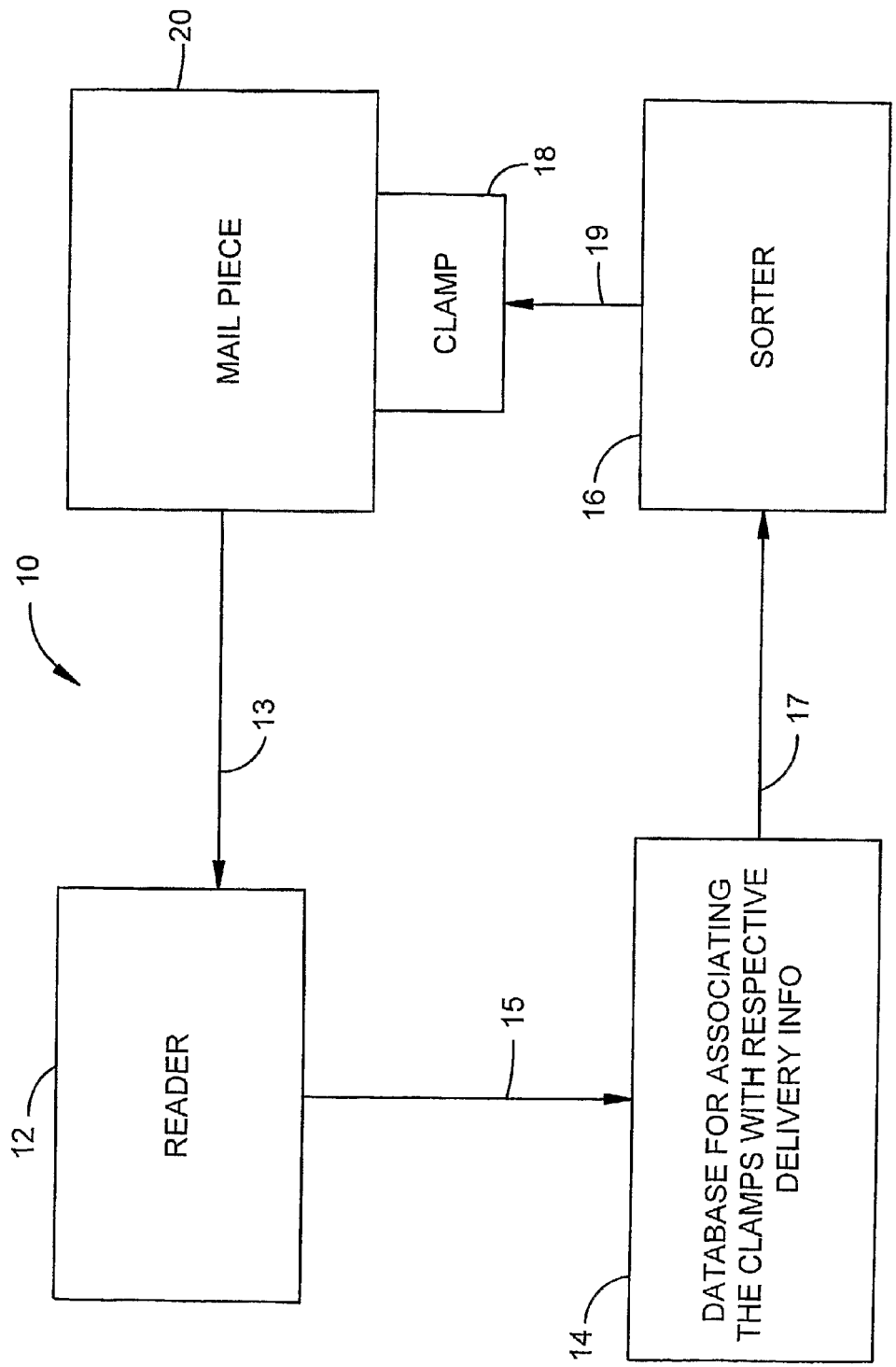
FIG. 11 is a block diagram of a system according to an embodiment of the present invention.

Overview:

FIG. 11 gives a simple systematic overview of an embodiment of the present invention, in terms of a block diagram. The system 10 includes a mail piece 20 attached to a clamp 18. The mail piece furnishes delivery information to a reader 12, along a line 13, either before or after the mail piece is attached to the clamp. A database 14 receives the delivery info on the line 15, and creates an association between the clamps 18 and respective delivery info of the mail pieces 20. This association is provided to a sorter 16 on a line 17. Based on the association, the sorter 16 manipulates the clamp 18 via the line 19, so that ultimately the clamps are arranged in an optimal sequence for delivery of the attached mail pieces to destination addresses.

Figure 12:
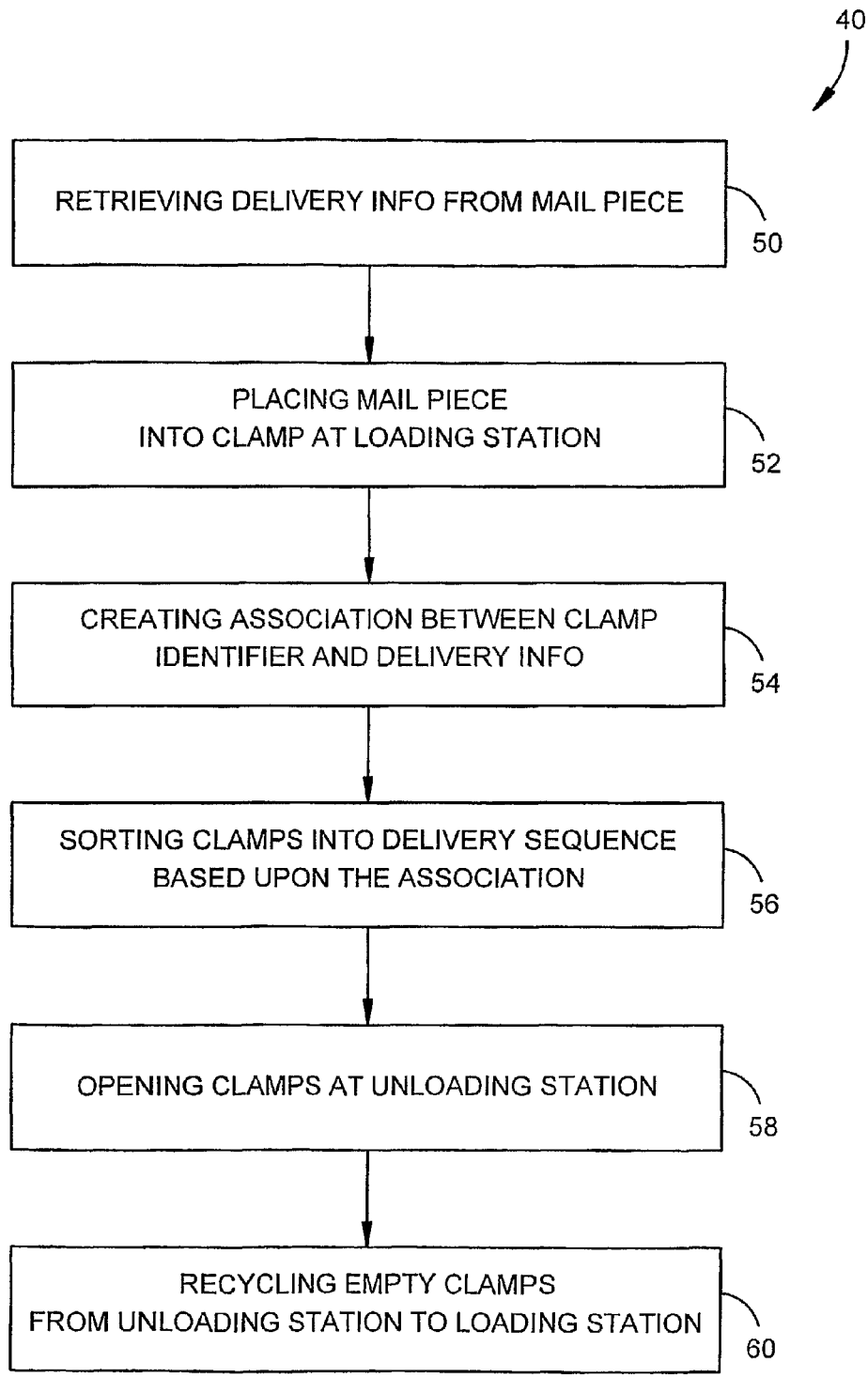
FIG. 12 is a flow chart of a method according to an embodiment of the present invention.

FIG. 12 describes a simple method 40 according to an embodiment of the present invention, in terms of a flow chart.

Mail piece information including delivery information is retrieved 50 from a mail piece. Then the mail piece is placed 52 into a clamp at a loading station. Subsequently, an association is created 54 between the identifier on the clamp and the delivery information. The clamps are then sorted 56 into a delivery sequence based upon the association. Once sorted, the clamps are opened 58 at an unloading station, thus releasing the mail pieces for delivery to destination addresses. The empty clamps are then recycled 60 from the unloading station back to the loading station. The mail piece information can optionally be associated with identifier information on the tray.

It is to be understood that all of the present figures, and the accompanying narrative discussions of best mode embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed is:

1. A sorting system, for accepting a group of mail pieces at a loading station, for sorting the group of mail pieces into a desired sequence according to delivery information on the mail pieces, and for moving the mail pieces to at least one unloading station, the system comprising:
   a reader for retrieving delivery information associated with each mail piece from a plurality of the mail pieces;
   a plurality of clamps, each clamp dimensioned for receipt of at least one mail piece;
   means for placing each mail piece from the group into one of said clamps;
   means for creating an association between the retrieved delivery information of each mail piece and a respective unique readable identifier affixed to each clamp to identify each clamp;
   a sorter for moving the clamps which hold the mail pieces, based upon the association of the unique readable identifier of each clamp with the retrieved delivery information, so that the mail pieces held by said clamps are sorted according to the desired sequence; and
   means for opening the sorted clamps to release the mail pieces at the at least one unloading station.

2. The sorting system of claim 1 wherein the desired sequence is an order in which the mail pieces are intended to be delivered.

3. The sorting system of claim 1, wherein the delivery information of at least one of the mail pieces includes address information indicative of a destination address, and wherein a respective one of the clamps comprises:
   jaws for releasably holding the mail piece; and
   a machine readable identifying means;
   wherein the identifying means includes clamp information which, in combination with the address information on the mail piece, enables sortation of the mail piece.

4. The sorting system of claim 1 wherein the clamps are dimensioned for handling each mail piece so that each mail piece received by one of the clamps is positioned by the clamp so that a face of the mail piece is at least temporarily substantially perpendicular to the direction of motion of the mail piece.

5. The sorting system of claim 1 wherein the mail pieces have faces such that, when the mail pieces are respectively received by the clamps, the faces are at least temporarily positioned face to face relative to each other, each of the mail pieces being in a generally vertical orientation.

6. The sorting system of claim 1, further comprising recycling equipment, for recycling at least one of the clamps from the unloading station to the loading station.

7. The sorting system of claim 6, configured for simultaneously loading, sorting, and unloading separate batches of the mail pieces.

8. The sorting system of claim 1, wherein the loading station is configured so that the clamps are fed into a queue before moving the queue from the loading station.

9. The sorting system of claim 1, configured for handling non-machine readable mail pieces in substantially the same fashion as machine readable mail.

10. The sorting system of claim 1, wherein the sorter includes at least one first drive system, at least one second drive system, and means for moving the clamps from the at least one first drive system to the at least one second drive system.

11. The sorting system of claim 10, wherein the sorter includes a controller for assigning address information to the at least one second drive system, and for moving to the second drive system only the clamps having mail destined for an address corresponding to the address information.

12. The sorting system of claim 1, further comprising means for initially spacing the clamps at a distance from one another, and for subsequently reducing the distance at least temporarily when the clamps are between the loading station and the at least one unloading station.

13. The sorting system of claim 1, wherein the unloading station is configured so that the clamps move to an inverted orientation whereby the clamps are beneath each of the respective mail pieces at the unloading station.

14. A sorting system, for accepting a group of mail pieces at a loading station, for sorting the group of mail pieces into a desired sequence according to delivery information on the mail pieces, and for moving the mail pieces to at least one unloading station, the system comprising:
   a reader for retrieving delivery information associated with each mail piece from a plurality of the mail pieces;
   a plurality of clamps, each clamp dimensioned for receipt of at least one mail piece;
   means for placing each mail piece from the group into one of said clamps;
   means for creating an association between the retrieved delivery information of each mail piece and its respective clamp;
   a sorter for moving the clamps which hold the mail pieces, based upon the association of each clamp with the retrieved delivery information, so that the mail pieces held by said clamps are sorted according to the desired sequence; and
   means for opening the sorted clamps to release the mail pieces at the at least one unloading station,
   wherein the unloading station is configured so that the clamps move to an inverted orientation whereby the clamps are beneath each of the respective mail pieces at the unloading station.

15. The sorting system of claim 14, wherein the sorting system includes means for orienting the clamps above the respective mail pieces, at a point before reaching the unloading station.

16. The sorting system of claim 15, wherein the loading station is configured so that the clamps exiting the loading station move from an inverted orientation, in which the clamps are respectively beneath the mail pieces, to a non-inverted orientation.

17. The sorting system of claim 14,
wherein the means for opening the sorted clamps includes a jaw opener that opens each of the clamps, and
wherein the system further comprises means for lowering each of the clamps away from the mail piece previously held by the clamp, after the clamp is opened.

18. A method of mail sortation, for accepting a group of mail pieces at a loading station, for sorting the group of mail pieces into a desired sequence according to delivery information on the mail pieces, and for moving the mail pieces to at least one unloading station, comprising:
retrieving delivery information associated with each mail piece from a plurality of the mail pieces;
placing each mail piece from the group into one of a plurality of clamps;
creating an association between the retrieved delivery information of each mail piece and a respective unique readable identifier affixed to each clamp to identify each clamp;
moving the clamps which hold the mail pieces, based upon the association of the unique readable identifier of each clamp with the retrieved delivery information of the mail piece held by the clamps, so that the mail pieces held by said clamps are sorted according to the desired sequence; and
opening the sorted clamps to release the mail pieces at the at least one unloading station.

19. The method of claim 18, wherein the clamps handle each mail piece so that, at least temporarily, each mail piece is substantially perpendicular to the direction of motion of the mail piece.

20. The method of claim 18, in which the desired sequence is the order in which the mail pieces are intended to be delivered.

21. The method of claim 18 wherein the mail pieces are at least temporarily positioned face to face relative to each other, each of the mail pieces being in a generally vertical orientation.

22. The method of claim 18, wherein at least one of the clamps is recycled from the unloading station to the loading station.

23. The method of claim 18, wherein the clamps move to an inverted orientation whereby the clamps are beneath each of the respective mail pieces at the unloading station.

24. A method of mail sortation, for accepting a group of mail pieces at a loading station, for sorting the group of mail pieces into a desired sequence according to delivery information on the mail pieces, and for moving the mail pieces to at least one unloading station, comprising:
retrieving delivery information associated with each mail piece from a plurality of the mail pieces;
placing each mail piece from the group into one of a plurality of clamps;
creating an association between the retrieved delivery information of each mail piece and its respective clamp;
moving the clamps which hold the mail pieces, based upon the association of each clamp with the retrieved delivery information of the mail piece held by the clamps, so that the mail pieces held by said clamps are sorted according to the desired sequence; and
opening the sorted clamps to release the mail pieces at the at least one unloading station,
wherein the clamps move to an inverted orientation whereby the clamps are beneath each of the respective mail pieces at the unloading station.

25. The method of claim 24, wherein the clamps are oriented above the respective mail pieces at a point before reaching the unloading station.

26. The method of claim 24, wherein each of the clamps is opened as the clamp advances to a jaw opener, and wherein each of the clamps is lowered away from the mail piece after the clamp is opened.

27. A method of mail sortation, for accepting a group of mail pieces at a loading station, for sorting the group of mail pieces into a desired sequence according to delivery information on the mail pieces, and for moving the mail pieces to at least one unloading station, comprising:
retrieving delivery information associated with each mail piece from a plurality of the mail pieces;
placing each mail piece from the group into one of a plurality of clamps;
creating an association between the retrieved delivery information of each mail piece and its respective clamp;
moving the clamps which hold the mail pieces, based upon the association of each clamp with the retrieved delivery information of the mail piece held by the clamps, so that the mail pieces held by said clamps are sorted according to the desired sequence; and
opening the sorted clamps to release the mail pieces at the at least one unloading station,
wherein the clamps exiting the loading station move from an inverted orientation, in which the clamps are respectively beneath the respective mail pieces at the loading station, to a non-inverted orientation.

\* \* \* \* \*